(12) United States Patent
Zhao et al.

(10) Patent No.: US 12,026,974 B2
(45) Date of Patent: Jul. 2, 2024

(54) TRAINING METHOD AND TRAINING APPARATUS FOR A NEURAL NETWORK FOR OBJECT RECOGNITION

(71) Applicant: CANON KABUSHIKI KAISHA, Tokyo (JP)

(72) Inventors: Dongyue Zhao, Beijing (CN); Dongchao Wen, Beijing (CN); Xian Li, Beijing (CN); Weihong Deng, Beijing (CN); Jiani Hu, Beijing (CN)

(73) Assignee: Canon Kabushiki Kaisha, Tokyo (JP)

( * ) Notice: Subject to any disclaimer, the term of this patent is extended or adjusted under 35 U.S.C. 154(b) by 415 days.

(21) Appl. No.: 17/519,123

(22) Filed: Nov. 4, 2021

(65) Prior Publication Data

US 2022/0138454 A1 May 5, 2022

(30) Foreign Application Priority Data

Nov. 5, 2020 (CN) .......................... 202011220649.6

(51) Int. Cl.
*G06K 9/00* (2022.01)
*G06F 18/214* (2023.01)
*G06N 3/045* (2023.01)
*G06V 40/16* (2022.01)

(52) U.S. Cl.
CPC ............ *G06V 40/16* (2022.01); *G06F 18/214* (2023.01); *G06N 3/045* (2023.01)

(58) Field of Classification Search
CPC ........... G06T 2207/20081; G06T 2207/20084; G06N 3/08–0985; G06N 3/02–126; G06N 20/00–20; G06F 18/214–2155; G06F 7/023; G06F 40/16; G06K 9/6256; G06K 9/6257; G06K 9/6259; G06V 10/70; G06V 10/82; G06V 10/774–7796
See application file for complete search history.

(56) References Cited

U.S. PATENT DOCUMENTS

| 2018/0268292 A1* | 9/2018 | Choi ..................... G06V 10/454 |
| 2019/0244103 A1* | 8/2019 | Wang ..................... G06N 3/088 |
| 2021/0264106 A1* | 8/2021 | Li ........................ G06F 18/2148 |

(Continued)

OTHER PUBLICATIONS

Yuge Huang et al., Improving Face Recognition from Hard Samples via Distribution Distillation Loss, 2020, 22 pages, https://arxiv.org/abs/2002.03662v3.

*Primary Examiner* — Atiba O Fitzpatrick
(74) *Attorney, Agent, or Firm* — Canon U.S.A., Inc. IP Division

(57) ABSTRACT

The present invention relates to method and apparatus for training a neural network for object recognition. A training method which includes inputting a training image set containing an object to be recognized, dividing the image samples in the training image set into simple samples and hard samples, for each kind of the image sample and the variation image sample, performing, a transitive transfer, calculating a distillation loss of the transferred student feature of the image sample relative to a teacher feature extracted from corresponding image sample of the other kind, classifying, the image sample, and calculating a classification loss of the image sample, calculating a total loss related to the training image set, and updating parameters of the neural network according to the calculated total loss.

20 Claims, 13 Drawing Sheets

(56) References Cited

U.S. PATENT DOCUMENTS

| | | | |
|---|---|---|---|
| 2021/0319266 A1* | 10/2021 | Chen | G06V 10/764 |
| 2022/0199258 A1* | 6/2022 | Yoo | G06N 3/091 |
| 2023/0075836 A1* | 3/2023 | Tang | G06V 10/82 |
| 2023/0222326 A1* | 7/2023 | Jafari | G06N 3/09 |
| | | | 706/25 |

* cited by examiner

Algorithm 1: Dynamic Dividing of Samples

Normal image data $x_N$, Augmented image data $x_A$, Max number of epochs $E$; Number of classes in the dataset $C$; Initial threshold $\epsilon$; Dynamic parameter $\alpha$; Hyper parameter $\lambda$;

for $e \in [1, E]$ do

1. $\alpha = (\frac{e}{E})^2$;

for $c \in [1, C]$ do 2. calculate a feature center $f_c$;

3. calculate an intra-domain distance $D = \|f - f_c\|$;

4. calculate a maximum intra-domain difference $D_d = D_{max} - D_{min}$;

5. obtain a threshold defining simple samples $\gamma_{easy} = (\epsilon + \lambda\alpha)D_d + D_{min}$;

if $D^{N \to N} < \gamma_{easy}^{N \to N}$ or $D^{N \to M} < \gamma_{easy}^{N \to M}$ /

$D^{A \to A} < \gamma_{easy}^{A \to A}$ or $D^{A \to M} < \gamma_{easy}^{A \to M}$ then define $x_{N/A}$ as a simple sample; $\xi_{N/A} = 1$;

else define $x_{N/A}$ as a hard sample; $\xi_{N/A} = 0$;

end if end for end for

FIG. 3

TRAINING METHOD AND TRAINING APPARATUS FOR A NEURAL NETWORK FOR OBJECT RECOGNITION

CROSS-REFERENCE TO RELATED APPLICATIONS

The present application claims the benefit of Chinese Patent Application No. 202011220649.6, filed Nov. 5, 2020, which is hereby incorporated by reference herein in its entirety.

FIELD OF THE DISCLOSURE

The present disclosure relates to a neural network for object recognition, and in particular, to a training method and a training apparatus for a neural network model.

BACKGROUND

In recent years, object detection/recognition/comparison/tracking in static images or a sequence of moving images (such as a video) has been widely and importantly applied to the fields of image processing, computer vision, and pattern recognition. Face/object recognition is one of the most important computer vision tasks, and its goal is to identify or verify a specific person/physical object based on the input photo/video. Recently, the neural network model for face/object recognition, especially the convolutional neural network (CNN) model, has made breakthroughs in significant improvement of its performance. Given a training dataset, the CNN training process uses a general CNN architecture as a feature extractor to extract features from the training images, and then calculates loss data by using various designed loss functions for supervised training of the CNN model. Thus, if the CNN architecture is selected, the performance of the object recognition model is driven by the loss function and the training dataset.

However, most of the existing public training datasets are composed of high-quality normal images, and a CNN trained on such training datasets generally has good recognizability for normal images. However, when the input image is a variation image with diverse variations in object pose, race, resolution, illuminance or the like, the recognition performance of the object recognition model is significantly reduced, because the object recognition model has not learnt robust feature representations from the training dataset having limited variations. Therefore, the main challenge of current object recognition models is to maintain a high recognition performance in unconstrained scenarios where the input image may have diverse variations.

The conventional solution is to generate images with specific variations by using image data synthesis or augmentation methods, and add them to the training dataset for training of the object recognition model. However, due to the feature domain discrepancy, training the synthesized or augmented images directly may make it difficult for the network to converge, or even if it converges, whilest the recognition performance of the resulting model on the synthesized or augmented images is increased, the recognition performance on the normal images is decreased, that is, so-called "negative transfer" occurs.

For example, Yuge Huang et al., "Improving Face Recognition from Hard Samples via Distribution Distillation Loss" has proposed a distillation loss function based on similarity distribution to narrow the performance gap between easy samples and hard samples. The method first uses an advanced classifier such as Arcface to construct two similarity distributions: a teacher distribution for easy samples and a student distribution for hard samples, and then uses the distribution-driven loss function to constrain the student distribution to approximate the teacher distribution, so that the overlap of positive pairs and negative pairs is reduced. However, the easy samples and hard samples are divided offline, and thus their similarity distributions actually have a fixed discrepancy. When there is a big discrepancy between the easy samples and the hard samples, there is also a big discrepancy in their actual feature domains. If the student distribution for the hard samples is pushed to approach the teacher distribution for the easy samples using only the loss function driven by the similarity distribution, on the one hand, it may be difficult for the network to converge and thus the final trained model cannot be obtained, on the other hand, it may lead to the negative transfer of knowledge. This method assumes that the teacher distribution for the easy samples is optimal in recognizability and is used to supervise the learning of the hard samples. However, since both of the easy samples and the hard samples actually act on the same classification loss function, the hard samples may have a large gradient effect to shift the training model towards its feature domain, resulting in the final trained model failing to be optimal on both of the easy samples and the hard samples.

SUMMARY

The present disclosure proposes a new neural network training method based on transitive knowledge distillation and bilateral classification. By introducing a transitive domain as a transition bridge, different feature domains are simultaneously drawn closer to each other from both directions, so as to avoid a large inter-domain discrepancy and reduce the performance gap between the normal images and the variation images. In addition, by adopting the dual-branch classification based on the curriculum learning strategy, the learning focus is gradually shifted from the normal images to the variation images during the learning process, reducing the negative impact from the variation images and increasing the upper limit of the representation learning.

According to one aspect of the present disclosure, there is provided a training method for a neural network for object recognition, comprising: inputting a training image set containing an object to be recognized, which includes a set of normal image samples and a set of variation image samples, into the neural network to extract a student feature of each of the image samples; dividing the image samples in the training image set into simple samples and hard samples based on the extracted student features; for each kind of the normal image sample and the variation image sample: performing, by respective transitive transfer adapter, a transitive transfer based on the dividing on the student feature of the image sample to obtain a transferred student feature; calculating a distillation loss of the transferred student feature of the image sample relative to a teacher feature extracted from corresponding image sample of the other kind; classifying, by respective classifier, the image sample based on the student feature; and calculating a classification loss of the image sample, calculating a total loss related to the training image set based on the distillation losses and the classification losses calculated for all image samples; and updating parameters of the neural network according to the calculated total loss.

According to one aspect of the present disclosure, there is also provided a training apparatus for a neural network for object recognition, including means for performing each of the steps of the above training method.

According to one aspect of the present disclosure, there is also provided an iterative training method that trains a neural network for multiple variation scenes by means of the above training method.

According to one aspect of the present disclosure, there is also provided a neural network trained by means of the above training method.

According to one aspect of the present disclosure, there is also provided a non-transitory computer-readable storage medium storing executable instructions thereon, which, when executed, can be used to implement the above training method.

DESCRIPTION OF THE DRAWINGS

A better understanding of the present disclosure may be obtained when considering following detailed description of embodiments in conjunction with the accompanying drawings in which the same or similar reference numerals are used in the drawings to indicate the same or similar components. All the drawings together with the following detailed description are included in the specification and form a part of the specification to further illustrate the embodiments of the present disclosure and explain the principles and advantages of the present disclosure. Where

FIG. 3 shows a pseudo code of dynamic sample dividing according to one or more aspects of the present disclosure;

Figure 1:
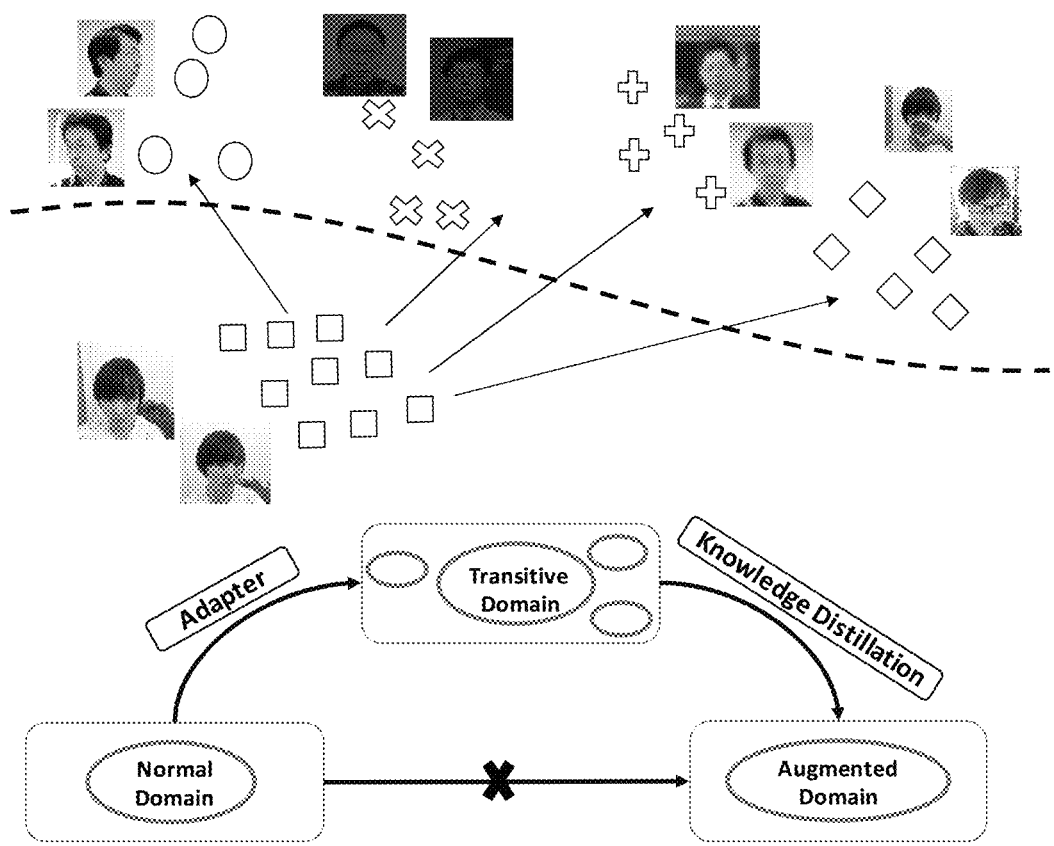
FIG. 1 is a schematic diagram showing the use of transitive transfer to fuse face images with different variations.

Further features of the present disclosure will become apparent from the following description of exemplary embodiments with reference to the attached drawings.

DETAILED DESCRIPTION OF PREFERRED EMBODIMENTS

Hereinafter, various exemplary embodiments of the present disclosure will be described in detail with reference to the accompanying drawings. For the sake of clarity and conciseness, not all implementations of the embodiments are described in this specification. It should be noted, however, that many implementation-specific settings can be made according to specific requirements when implementing the embodiments of the present disclosure.

In addition, in order to avoid obscuring the present disclosure due to unnecessary details, only the processing steps and/or device structures closely related to the technical solution of the present disclosure are shown in the drawings. The following description of the exemplary embodiments is merely illustrative, and is not intended as any limitation to the present disclosure and its applications.

[Overview]

Before giving a detailed description of each embodiment, a gist of the present disclosure will be described. The present disclosure uses a training image set including normal image samples and variation image samples containing an object to be recognized to train the object recognition model so that it can obtain excellent recognition performance in unconstrained scenarios.

In the context of the present disclosure, "image sample" in the training image set may refer to any image, such as a color image, a grayscale image and the like. The type and format of the image sample are not particularly limited, as long as such image can be processed to enable detecting whether the image contains the object. In addition, the image may be an original image or a processed version thereof, such as a version of the image that has undergone preliminary filtering or pre-processing before operations of this application are performed on the image.

In addition, when the image sample contains the object to be recognized, it means that the image sample contains an object image of the object. The object image may sometimes be referred to as an object area in the image sample. Object recognition is also referred to as the recognition of the object area in the image sample. The object to be recognized may be a person or a part thereof (such as face, hand, body, etc.), another animal or a plant, or any other objects that are expected to be detected. In the following, the typical human face is taken as an example of the object to be recognized, although the present disclosure is not limited thereto.

A typical example of the object recognition model is a neural network, such as a convolutional neural network (CNN). In the following, we will mainly take CNN as an example for description, but it should be understood that the present disclosure can be similarly applied to another neural network, such as Generative Adversarial Network (GAN), Recent Neural Network (RNN) or the like, or to even another deep learning model, as long as the model can extract the features of the object to be recognized.

As used herein, "normal image" refers to a high-quality image in terms of object recognition, such as those in traditional public datasets, and generally includes rich discriminative information. On the contrary, "variation image" refers to an image containing one or more types of variations, such as variations in object pose, race, resolution, and illumination, compared with a normal image. The variation image may be an image captured by an imaging apparatus, or an image obtained through a specific image processing. In the present disclosure, the variation image samples are generated mainly with the augmentation technology for one or more specific variation scenes, but the variation image is not limited thereto.

In order to obtain a CNN with a better generalization for diverse variation images, the variation image samples are input into the model along with the normal image samples.

In the context of the face recognition, the deep recognition model maps faces to a feature space so as to extract respective feature representations. The feature representation of the object may be in form of e.g. a vector, which may be referred to as a "feature vector" of the object. For example, the CNN will select the pixel texture information and positional coordinates of representative parts of the face as features to form the feature vector of the image. A loss function is designed to achieve a small intra-class distance and a large inter-class distance so that object recognition/detection/tracking can be performed based on the obtained feature vector. It should be understood that the form of feature representation may vary from the object recognition model as used, and is not particularly limited.

However, there may be a big discrepancy between the feature domain of the normal images and the feature domain of the variation images, and a key requirement for learning knowledge from different variation images is that the feature domain of the normal images (normal domain) and the feature domain of the variation images (variation domain) is correlated. As shown in FIG. 1, due to the obvious discrepancy in feature domains between the normal images and the images with different variations, the normal domain and the variation domain do not have enough common factors to narrow the gap therebetween, and it is difficult to find a direct correlation. Therefore, it is not feasible to enforce a knowledge transfer. Directly minimizing the distances for the same object will inevitably cause the negative transfer, because the knowledge in the normal domain is difficult to propagate to the target variation domain.

In view of this, the present disclosure proposes a concept of transitive knowledge distillation. As shown in FIG. 1, since the direct transfer is impossible, an adapter is introduced as a bridge connecting the normal domain and the target variation domain. This adapter converts the extracted feature into an intermediate feature, and transitively transfers the knowledge by means of transitive transfer learning (TTL), thereby establishing a correlation between the normal domain and the variation domain which have fewer factors in common. As a result, the interaction among variation images can be controlled during the training process, and the feature representations of different variation images are fused. Thereafter, a distillation learning of knowledge can be performed through the transitive domain generated by the adapter. By defining and reducing a distillation loss between the transitive domain and the target variation domain, the feature representation of the specific variation and the feature representation of the normal image are fused into the same feature representation.

Considering that it is unreasonable to use an adapter with the same structure to convert training samples of different qualities, the present disclosure divides the image samples into simple samples and hard samples with a dynamic sample dividing strategy, and enables the adapter to perform different degrees of transitive transfer on the simple samples and the hard samples.

In addition, when the normal image samples and the variation image samples are trained at the same time, if the model gives them the same confidence, the learned pattern will be the center of all training samples. However, since large variations of variation image samples are unreal and difficult to converge, they tend to provide a greater gradient influence to push the mixed pattern closer to the variation image samples, resulting in a failure to optimize the classification of the normal image samples.

In this regard, the present disclosure implements a dual-branch classification for the normal image samples and the variation image samples, that is, respective classifiers are used to classify the normal image samples and the variation image samples, so that the classification training of the normal image samples and the variation image samples do not affect each other. Based on the curriculum learning strategy, the influence of the classification loss of the variation image sample branch gradually increases with the training process, and thereby the learning of the model gradually transitions from the normal images to the variation images, alleviating the negative impact caused by the difficulty of optimization for the variation images and improving the upper limit of the representation learning.

[Training Method of the Neural Network]

The neural network training method according to the present disclosure will be described below in more detail.

As an example of the neural network, convolutional neural network (CNN) is a widely used deep learning model, includes convolution calculations and a deep structure, and has a strong capability of non-linear fitting. With the non-linear fitting capability of e.g. the convolutional neural network, when an image sample containing an object area is input into the convolutional neural network, information about the object hidden in the image can be mined. The convolutional neural network has a capability of self-learning, and parameters of the neural network can be determined through real data training without a complicated manual parameter design.

In the context of the present disclosure, one "epoch" of training refers to training once on all of the training dataset. Depending on actual needs, the training dataset can be divided into several batches at a batch size. Training on a batch of training data is called an iteration, and the parameters of the neural network are updated once for each iteration.

The training dataset used for training may include a large number of image samples including objects to be recognized (for example, human faces), such as tens of thousands, hundreds of thousands, and millions of images. The training dataset according to the present disclosure includes a set of normal image samples $(x_N, L_N)$ and a set of variation image samples $(x_A, L_A)$. Each of the variation image samples has a corresponding normal image sample, that is, the set of variation image samples corresponds to a subset of the set of normal image samples. In the context of the present disclosure, when a normal image sample and a variation image sample are "corresponding", it means that they contain the same object to be recognized (for example, personal identity).

The normal image samples may be, for example, high-quality images from a public dataset (for example, CAISA-WebFace). The variation image samples may be, for example, low-quality images obtained by the image augmentation technology, which will be directly referred to as "augmented images" in the following embodiments. A series of random variations are made to the normal image samples using the image augmentation technology to generate similar but different training samples, so as to expand the scale of the training dataset and reduce the model's dependence on certain attributes, thereby improving the generalization of the model. Typical image augmentations include: flipping, such as flipping left and right, flipping up and down; cropping, so that the object of interest appears in different positions, thereby reducing the model's dependence on the position of the object; color adjustment, such as changing the illuminance, contrast, saturation and tone of the image samples, thereby reducing the model's sensitivity to colors; resolution adjustment, such as generating low-quality images with different resolutions, etc. Depending on actual needs, augmentation may be performed either for only one variation scene to obtain augmented images including one type of variation, or for two or more variation scenes to obtain augmented images including multiple types of variations.

The image samples in the training dataset may undergo pre-processing. Pre-processing operations may include, for example, object detection, object alignment, normalization, and the like. In particular, the object detection can refer to, for example, detecting a face from an image containing the face and obtaining an image mainly containing the face to be recognized. The object alignment can refer to aligning object images having different poses in the images to the same or appropriate pose, and thus the object detection/recognition/tracking is performed based on the aligned object images. Face recognition is a common object recognition operation, and with respect to a training image set for face recognition, the pre-processing including e.g. face detection, face alignment or the like may be performed. Since the learning is performed using a gradient descent algorithm, the image sample data is normalized to a standard distribution with a mean of 0 and a variance of 1, so as to accelerate the convergence of the neural network. It should be noted that the pre-processing operations may also include other types of pre-processing operations known in the art, which will not be described in detail here.

Figure 2:
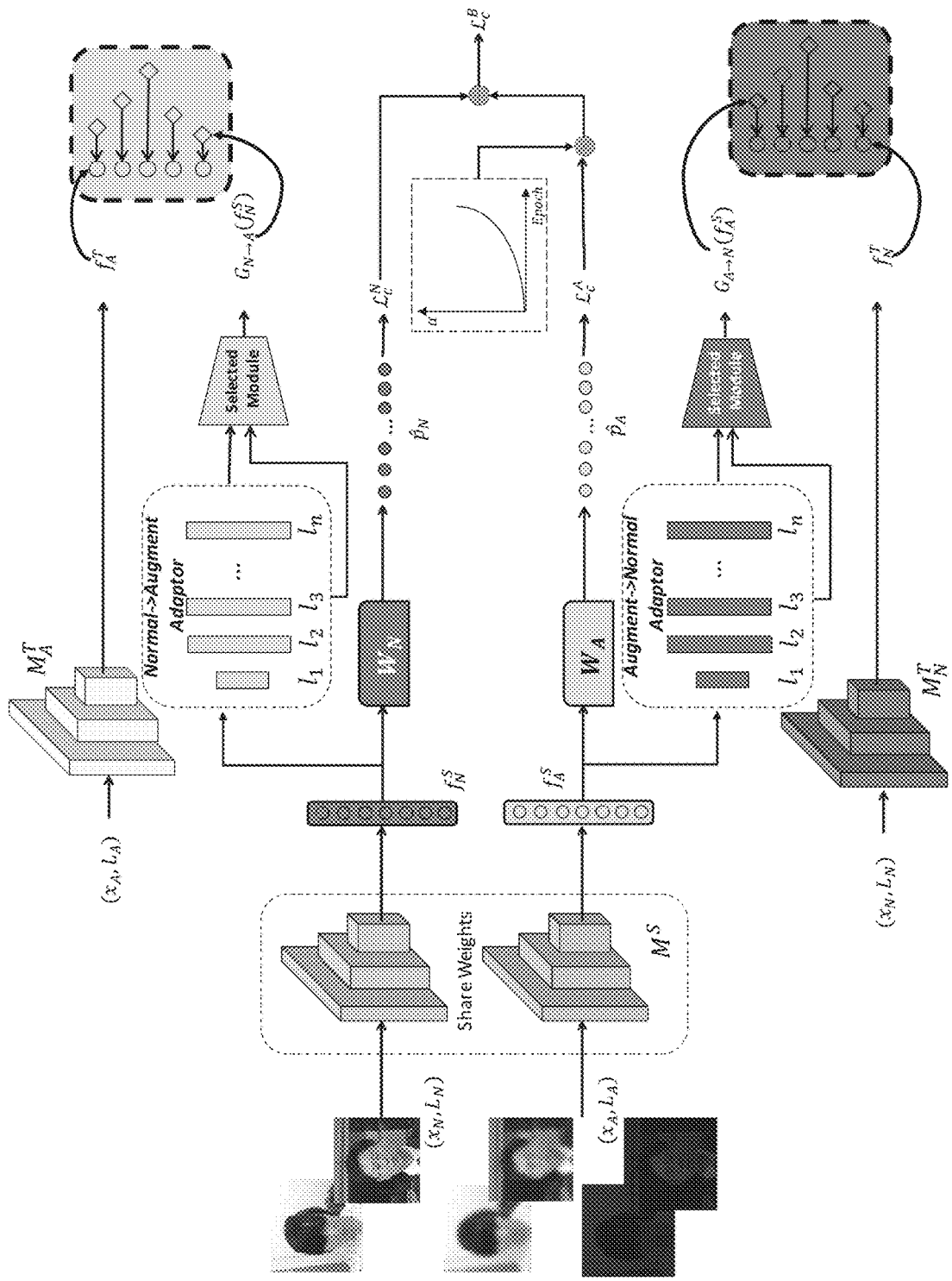
FIG. 2 is a schematic diagram of an overview of a neural network training method according to one or more aspects of the present disclosure.

FIG. 2 is a schematic diagram showing the neural network training method according to the present disclosure. In order to facilitate the following description, some symbols in FIG. 2 are defined first:

- $(x_N, L_N)$: a normal image sample, where $x_N$ represents normal image data, and $L_N$ is a label indicating that the sample is a normal image;
- $(x_A, L_A)$: an augmented image sample, where $x_A$ represents augmented image data, and $L_A$ is a label indicating that the sample is an augmented image;
- $M^S$: a neural network that needs to be trained, serving as a student role to be guided in the transitive transfer learning, so it is also called a student network hereinafter;
- $M_N^T$: a neural network trained for normal images, serving as a teacher role to provide guidance in the transitive transfer learning, so it is also called a normal image teacher network hereinafter;
- $M_A^T$: a teacher network trained for augmented images, serving as a teacher role to provide guidance in the transitive transfer learning, so it is also called an augmented image teacher network hereinafter;
- $f^S_N \in \mathbb{R}^d$: when a normal image sample is input into the student network $M^S$, a student feature extracted by embedding the image into a d-dimensional Euclidean space, where d is the number of the embedded feature dimension;
- $f^S_A \in \mathbb{R}^d$: a student feature extracted when an augmented image sample is input into the student network $M^S$, wherein the number of feature dimension is d;
- $f^T_N \in \mathbb{R}^d$: a teacher feature extracted when a normal image sample is input into the normal image teacher network $M_N^T$, wherein the number of feature dimension is d;
- $f^T_A \in \mathbb{R}^d$: a teacher feature extracted when an augmented image sample is input into the variation image teacher network $M_A^T$, wherein the number of feature dimension is d;
- $G_{N \to A}(f^S_N) \in \mathbb{R}^d$: a transferred student feature obtained after the student feature $f^S_N$ is converted by the respective transitive transfer adapter (Normal→Augmented adapter), wherein the number of feature dimension is d;
- $G_{A \to N}(f^S_A) \in \mathbb{R}^d$: a transferred student feature obtained after the student feature $f^S_A$ is converted by the respective transitive transfer adapter (Augmented→Normal adapter), wherein the number of feature dimension is d;
- $W = \{W_1, W_2, \ldots, W_C\} \in \mathbb{R}^{d \times c}$: weights of the final classification layer (a full connection layer in most cases) in the deep convolutional neural network, wherein C represents the number of classes in the training dataset.

Aspects of the training method will be described in detail with reference to FIG. 2.

Feature Extraction

In the training method shown in FIG. 2, first, the training dataset is input into the student network $M^S$. Although the normal image samples $(x_N, L_N)$ and the augmented image samples $(x_A, L_A)$ are shown as being input into separate convolutional neural networks in FIG. 2, it is only for the purpose of intuitive illustration. They are actually input into the same convolutional neural network, that is, the student network $M^S$. The student network $M^S$ can adopt various convolutional neural network architectures known in the art, such as VGG16, ResNet, Senet or the like, and is not particularly limited here.

Generally speaking, the student network $M^S$ may include convolutional layer(s), activation function(s), pooling layer(s), and so on.

In the convolutional layer, the filter (i.e., convolution kernel) whose parameters can be self-learnt is convoluted with a data matrix so as to extract hidden features in the input data. Considering that the size of the convolution kernel is often much smaller than that of the data matrix, the convolution kernel moves on the data matrix to traverse the data matrix, and the moving distance is called a stride. In addition, in order to match the movement of the convolution kernel, the data matrix may be subjected to an edge expansion (that is, edge filling). Convolution kernels with different parameters are used to extract different features from the data matrix, and their corresponding outputs after convolution are called feature channels. In order to extract richer features, the number of feature channels gradually increases as the number of layers of the network deepens.

The output of the convolutional layer often passes through the activation function, such as ReLU, Sigmoid or the like, before being input to the next layer. The activation function is usually a non-linear function, so the activation function can introduce a non-linear fitting capability into the CNN. Deep learning can exhibit a high performance just because a high nonlinearity can be obtained by repeating nonlinear transformations with a multilayer structure. If there is no activation function responsible for non-linear variations and the network includes only linear transformations, then there is only an equivalent single-layer linear transformation regardless of the number of layers, and the multiple structure is useless. Obviously, as the number of layers increases, the deep learning exhibits a stronger nonlinearity and a higher performance.

The pooling layer down-samples the input matrix to reduce the amount of data and calculations of the neural network. Pooling operations include maximum pooling and average pooling. The feature vectors obtained by different pooling layers can be combined into a feature vector to facilitate predicting an output by a subsequent network structure.

The student network $M^S$ has initial parameters to facilitate the startup of the neural network. The student network $M^S$ extracts the respective feature from each of the input image samples, such as the student feature $f^S_N$ from the normal image sample $(x_N, L_N)$, and the student feature $f^S_A$ from the augmented image sample $(x_A, L_A)$. Therefore, the student network $M^S$ can be regarded as a feature extractor formed by a backbone network of the convolutional neural network.

Dynamic Sample Dividing

Before the transitive transfer learning on the extracted student features, the image samples can be divided (not shown in FIG. 2), so as to adapt object images of different qualities to corresponding transitive transfer features.

In view that offline dividing of image samples in the prior art causes a fixed discrepancy in their feature domains, the present disclosure proposes a dynamic sample dividing strategy based on the extracted features. According to embodiments of the present disclosure, simple samples and hard samples can be defined based on distances (such as but not limited to L1-norm distances) from the features extracted from the training samples by the student network $M^S$ to the centers of different feature domains.

FIG. 3 shows a pseudo code of the dynamic sample dividing algorithm according to the present disclosure. Referring to FIG. 3, for each epoch of training, the following steps are performed:

1. A dynamic parameter α can be calculated, which can be calculated as a function of the training epoch, for example $$\alpha = \left(\frac{e}{E}\right)^2,$$

where e is the current training epoch and E is the maximum training epoch, so the value of the parameter α increases with the training process;

2. Given the number C of classes involved in the training dataset (each image sample can be accompanied by a label indicating its actual class), for each class in the training dataset, centers $f_c$ of domains of the extracted student features are calculated, including a center of feature domain corresponding to the normal image samples (the normal feature center), a center of feature domain corresponding to the augmented image samples (the augmented feature center), and a center of mixed feature domain corresponding to all image samples (the mixed feature center). At this stage, the normal image samples and the augmented image samples can be distinguished by the respective labels $L_N$ and $L_A$;

3. For each of the image samples, an intra-domain distance $D=\|f-f_c\|$ from the student feature f to each of the feature centers $f_c$ can be calculated, wherein the distance calculated here can be a L1-norm distance;

4. For each of the feature domains, its maximum intra-domain difference $D_d=D_{max}-D_{min}$ is calculated, that is, a difference between the maximum intra-domain distance and the minimum intra-domain distance in each feature domain;

5. For each of the feature domains, a threshold $\gamma_{easy}=(\epsilon+\lambda\alpha)D_d+D_{min}$ for defining simple samples is calculated. Three parameters are involved here, in which the threshold E is an initial threshold, the dynamic parameter α is the parameter related to the training epoch calculated as above, and the hyperparameter λ is a parameter set before the training and does not change with the training process;

6. Subsequently, the samples can be divided based on the calculated threshold. Specifically, for a normal image sample, if a distance between its feature and the normal feature center is less than the corresponding threshold $D^{N \to N} < \gamma_{easy}^{N \to N}$ or a distance between the feature and the mixed feature center is less than the corresponding threshold $D^{N \to M} < \gamma_{easy}^{N \to M}$, the image sample is a simple sample, otherwise it is a hard sample; and for an augmented image sample, if a distance between its feature and the augmented feature center is less than the corresponding threshold $D^{A \to A} < \gamma_{easy}^{A \to A}$ or a distance between its feature and the mixed feature center is less than the corresponding threshold $D^{A \to M} < \gamma_{easy}^{A \to M}$, then the image sample is simple Sample, otherwise it is a hard sample.

Figure 4:
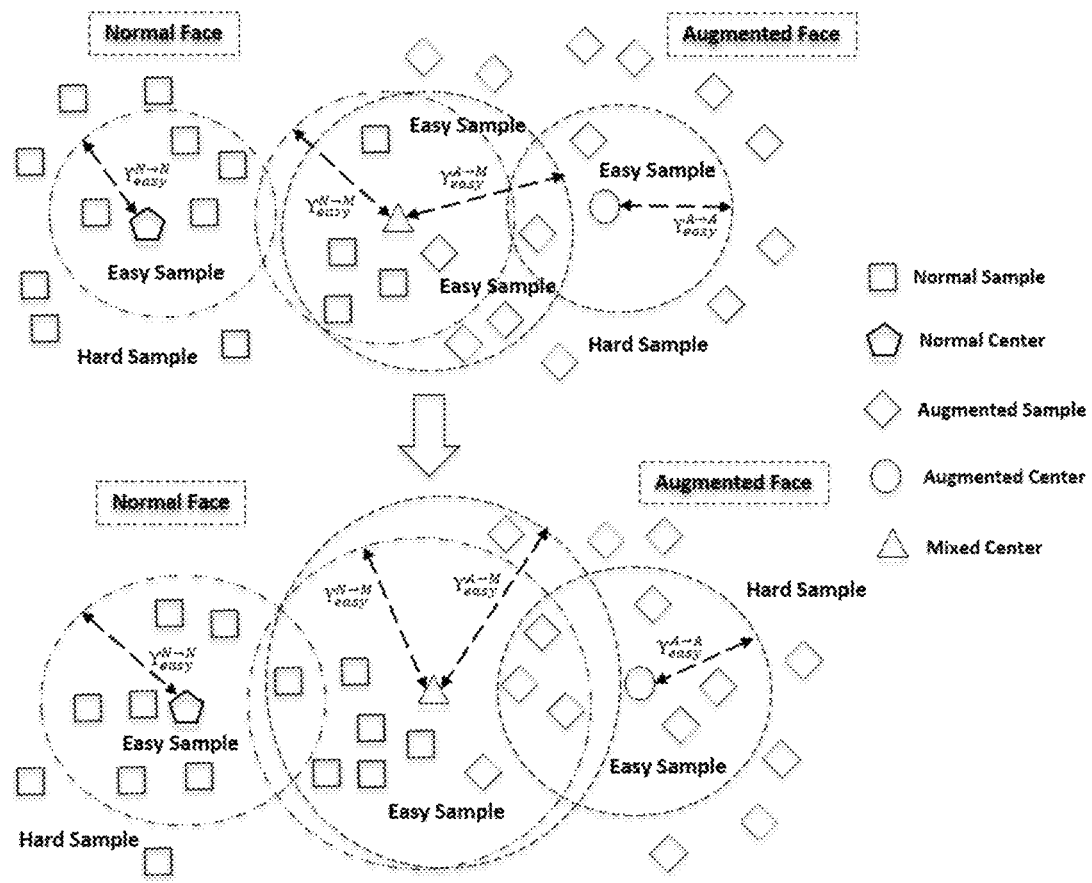
FIG. 4 shows a change of thresholds for defining simple samples over the training process.

At the beginning of training, a small initial threshold E can be set to define the initial simple samples. FIG. 4 shows a change of the threshold γ for defining simple samples during the training process. In the early stage of training, since the student network $M^S$ being trained is not stable enough for image samples with different variation, most of the image samples are defined as hard samples. Thereafter, as shown in FIG. 4, as the student network $M^S$ increases its ability to distinguish the hard samples, the dynamic parameter α dynamically increases the threshold γ for defining the simple samples, so that more and more image samples are divided into the simple samples, and thus the discriminative information of different feature domains can be gradually learned and integrated into a compact intra-class feature representation.

Transitive Knowledge Distillation

Continuing with reference to FIG. 2, the student features extracted by the student network $M^S$ can be input into different adapters so as to be converted to the transitive domain. Specifically, the student feature $f^S_N$ extracted from the normal image sample is input into the Normal→Augmented adapter, and the student feature $f^S_A$ extracted from the augmented image sample is input into the Augmented→Normal adapter.

According to the present disclosure, based on the transitive transfer learning idea, the transitive transfer adapter is used to convert the features extracted by the student network to intermediate features (also called transferred student features), thereby serving as a bridge connecting the normal domain and the target variation domain, and amplifying hidden information for specific variations. Since the adaptation directions between the two domains are different, the Normal→Augmented adapter and the Augmented→Normal adapter are used respectively to save and restore knowledge, and effectively expand the potential discriminative information through the transitive transfer.

The Normal→Augmented adapter and the Augmented→Normal adapter may be implemented as a neural network with the same structure, such as a convolutional neural network, but have different parameters and are used separately. As an example, both of these two transitive transfer adapters may be a backbone network of a convolutional neural network with multiple convolutional layers (activation functions) and pooling layers, and each of the layers ensures that the number of feature dimensions is unchanged. They have initial parameters and are constantly updated over the training process.

Each of the transitive transfer adapters can adapt corresponding transitive transfer features for image samples of different qualities. For example, for a normal image sample or an augmented image sample that contains rich discriminative information, a transitive transfer feature from a deep layer can be output to fully extract information across the domains; and for an augmented image that lacks recognizability, such as a low-resolution image, a transitive transfer feature from a shallow layer can be used to extract enough information for ensuring rapid convergence.

The quality of the image sample is defined by the dynamic sample dividing strategy described above, and the transitive transfer from the shallow layer to the deep layer is naturally applied to the image sample of different quality. Therefore, the output of the transitive transfer adapter according to the present disclosure can be defined as:

$$\begin{cases} G_{N \to A}(f_N^S) = G_{N \to A}^{deep}(f_N^S) * \xi_N + G_{N \to A}^{shallow}(f_N^S) * (1 - \xi_N), \\ G_{A \to N}(f_A^S) = G_{A \to N}^{deep}(f_A^S) * \xi_A + G_{A \to N}^{shallow}(f_A^S) * (1 - \xi_A), \end{cases} \quad (1)$$

where $G_{N \to A}$ is the Normal→Augmented adapter, and $G_{A \to N}$ is the Augmented→Normal adapter. When the normal/augmented image sample is defined as a simple sample, $\xi_{N/A}=1$, then a deep-layer transitive transfer feature $G_{N \to A}^{deep}(f_N^S)/G_{A \to N}^{deep}(f_A^S)$ is selected as output; when the normal/augmented image sample is defined as a hard sample, $\xi_{N/A}=0$, then the shallow-layer transitive transfer feature $G_{N \to A}^{shallow}(f_N^S)/G_{A \to N}^{shallow}(f_A^S)$ is selected as output.

Figure 5:
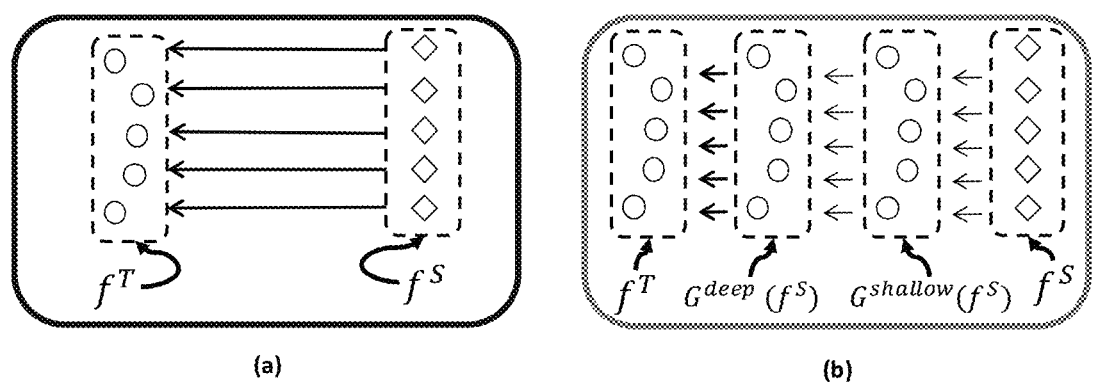
FIG. 5 is a schematic diagram showing a traditional direct transfer and the transitive transfer according to one or more aspects of the present disclosure.

FIG. 5 is a schematic diagram showing the traditional direct transfer and the transitive transfer according to the present disclosure. (a) of FIG. 5 shows that the feature domain discrepancy is reduced directly. However, due to the huge domain discrepancy between the normal images and the augmented images, it is difficult to find enough common factors to narrow the gap between them. Directly minimizing the distance for the same object will inevitably cause the negative transfer, because the knowledge in the normal domain is difficult to propagate to the target variation domain. (b) of FIG. 5 selects specific transitive transfer features to be adapted to object images of different qualities, so that information with common factors can be correlated.

On the other hand, in order to balance the knowledge transition among different variation images, two teacher models can be introduced for knowledge distillation. As shown in FIG. 2, the neural network model $M_N^T$ (i.e., the normal image teacher network) can be pre-trained on the normal image set and fixed, and the neural network model $M_A^T$ (i.e., the normal image teacher network) can be pre-trained on the augmented image set and fixed, both serving as teacher networks in the subsequent training of the student network. Here, the teacher networks $M_N^T$ and $M_A^T$ may be e.g. convolutional neural networks, although the present disclosure is not limited thereto.

Subsequently, the normal image samples in the training image set input into the student network $M^S$ are also input into the normal image teacher network $M_N^T$ to extract the teacher feature $f_N^T$; the augmented image samples in the training image set input into the student network $M^S$ are also input into the augmented image teacher network $M_A^T$ to extract the teacher feature $f_A^T$. It should be understood that since the teacher networks $M_N^T$ and $M_A^T$ have been pre-trained, the training dataset may be input into the student network $M^S$ while inputting the corresponding image samples to the teacher network, or the teacher features may be extracted and stored before the training of the student network $M^S$, for use in the training process of the student network $M^S$.

As shown in the lower part of FIG. 2, since the student feature $f_A^S$ extracted from the augmented image sample lacks recognizability, the normal image teacher network $M_N^T$ can be used to guide the restoration of the recognizability for the augmented image in the student network; at the same time, as shown in the upper part of FIG. 2, the augmented image teacher network $M_A^T$ can also be used to guide the saving of target discriminative information for the normal image in the student network. In this way, the student network $M^S$ learns from both sides the feature representation that spans variations.

Subsequently, the knowledge distillation can be performed on the transitive transfer features (the transitive domain) from the adapter and the teacher features (the target domain) provided by the teacher networks. In the distillation to the target variation domain, a distillation loss of the transitive transfer student feature $G_{N \to A}(f_N^S)$ of the normal image sample relative to the teacher feature $f_A^T$ of the corresponding augmented image sample can be calculated as a L1-norm distance $\|G_{N \to A}(f_N^S) - f_A^T\|$ between them, and accordingly, in the distillation to the target normal domain, a distillation loss of the transitive transfer feature $G_{A \to N}(f_A^S)$ of the augmented image sample relative to the teacher feature $f_N^T$ of the corresponding normal image sample is calculated as a L1-norm distance $\|G_{A \to N}(f_A^S) - f_N^T\|$ between them. Therefore, the total distillation loss function is defined as follows:

$$\mathcal{L}_d = \|G_{N \to A}(f_N^S) - f_A^T\| + \|G_{A \to N}(f_A^S) - f_N^T\| \quad (2)$$

where $G_{N \to A}$ and $G_{A \to N}$ represent the Normal→Augmented adapter and the Augmented→Normal adapter, respectively. By reducing the distillation loss between the transitive domain and the target domain, the feature representation of a specific variation and the normal feature representation can be fused into the same feature representation.

By means of the transitive effect of the transitive transfer adapters and the constraint effect of the distillation function, the transitive knowledge distillation is carried out towards different target domains, which reduces the domain discrepancy between the normal images and the augmented images from both sides, promotes the positive transfer and reduces the negative transfer, and ensures that the features of different variation images are integrated into the target representation.

Dual-Branch Classification

When training the student network with the normal image samples and the variation image samples, if it is assumed that all image samples finally pass the same classifier (for example, a fully connected layer), then the resulting trained pattern will be in the center of all image samples. However, since most of the image samples with large variations are unreal and difficult to converge, they will have a large gradient constantly existing over the training process, and push the trained model closer to the augmented image, as shown in (a) of FIG. 6 which is a schematic diagram showing the classification learning of the normal image samples and the augmented image samples. Therefore, it is difficult to optimize the classification of the normal image samples, resulting in a pull-down of the upper limit of the representation learning.

To solve this problem, the present disclosure proposes a dual-branch classification strategy based on curriculum learning.

First, based on the idea of curriculum learning, early stage of the training will focus on learning the pattern of the normal images, and as the training process gradually increases the confidence of the augmented images, the network model transitions to the learning of hard samples. Specifically, a parameter β is used to indicate the confidence of the augmented images, and the parameter β is assigned with a small value in the early stage of training, so that the normal image samples can be well learned without being negatively affected by the augmented image samples; then as the training process gradually increases the guiding effect of the augmented image samples, the variation images are brought close to the normal images, as shown in (b) of FIG. 6. Now, the classification loss function can be defined as:

$$\begin{cases} \beta = (e/e_{max})^2, \\ \mathcal{L}_c = \mathcal{L}_c^N(W^T f_N^S, L_N) + \beta \mathcal{L}_c^A(W^T f_A^S, L_A), \end{cases} \quad (3)$$

where e is the current training epoch, $e_{max}$ is the maximum training epoch, W is the classifier, and $L_N$ and $L_A$ are the labels of the image samples.

Figure 6:
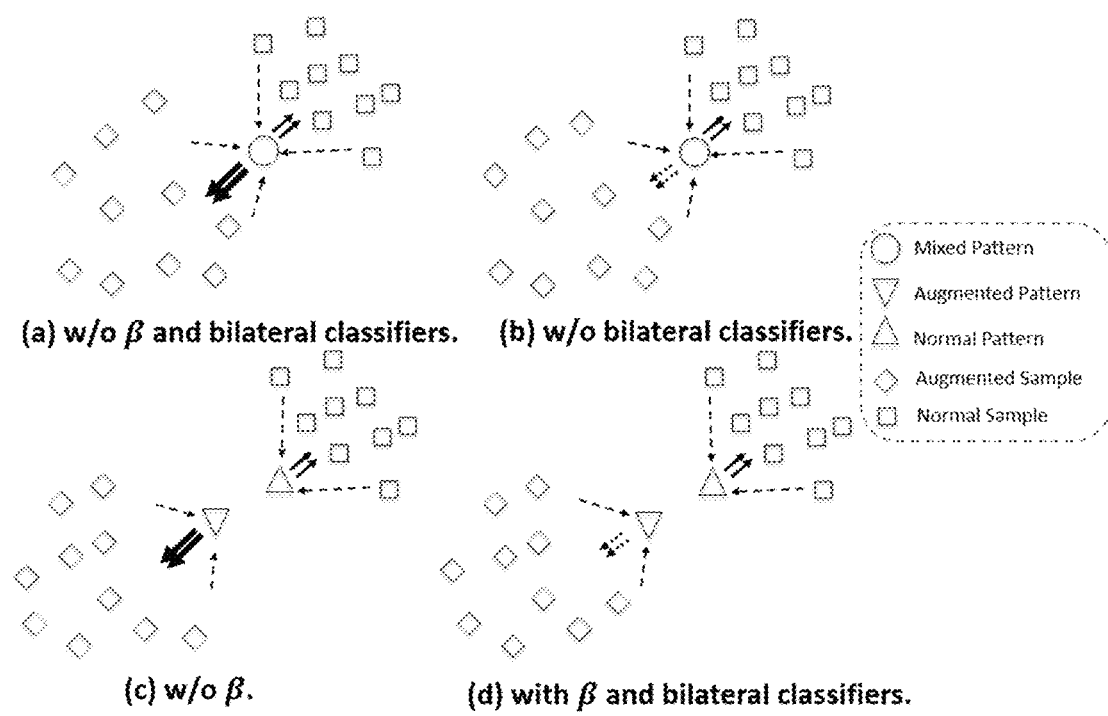
FIG. 6 is a schematic diagram showing classification learning of normal images and variation images.

However, in case where only the curriculum learning strategy is employed, as the parameter β increases, the learned model may be biased toward the gradient of the augmented images, as shown in (c) of FIG. 6. Therefore, in order to ensure that the learned model is always close to the feature domain of the normal images and is not biased to the gradient of the augmented images due to the increase of the parameter β, as shown in (d) of FIG. 6, the present disclosure adopts a dual-branch classification so that the training of classification branches of the normal images and the variation images does not affect each other.

Specifically, as shown in FIG. 2, independent classifiers are used to classify the normal image samples and the augmented image samples. As one of the branches, the classifier $W_N$ classifies the normal image samples based on the student features $f_N^S$ extracted from the normal image samples to obtain a probability distribution $\hat{p}_N$; as the other of the branches, the classifier $W_A$ classifies the augmented image samples based on the student features $f_A^S$ extracted from the augmented image samples to obtain a probability distribution $\hat{p}_A$. The classifiers $W_N$ and $W_A$ can be implemented as, for example, a fully connected layer to synthesize the discriminative information in the feature vectors. Assuming that the total number of classes in the training set is C, each probability of the probability distributions $\hat{p}_N$ and $\hat{p}_A$ indicates a probability (or reliability) that the image sample belongs to each of the C classes.

Subsequently, a classification loss function can compare the obtained classification probability with the true value (for example (0, 1, 0, . . . , 0), where 1 indicates the true value) to determine a difference between the two, such as Crossover Entropy, as the classification loss data. According to the present disclosure, the classification loss function may include but is not limited to ArcFace loss function, CosFace loss function, SphereFace loss function, etc.

Therefore, the final classification loss function is calculated as:

$$\mathcal{L}_c^B = \mathcal{L}_c^N(W^T_N f_N^S, L_N) + \beta \mathcal{L}_c^A(W^T_A f_A^S, L_A) \quad (4)$$

where $W^T_N$ represents the classifier for the normal image branch, and $W^T_A$ represents the classifier for the augmented image branch.

Under the guidance of both of the parameter 3 and the dual classifiers, the classification training of the student network can greatly reduce the negative impact of the augmented image samples, and maintain the characteristic of intra-class compactness and inter-class separation in each feature domain.

Updating of Parameters

The loss data from transitive knowledge distillation and the loss data from classification can be integrated for updating parameters.

According to the present disclosure, a hyperparameter η is used to balance the total loss function, and the total loss function can be defined as:

$$\mathcal{L} = \mathcal{L}_c^B + \eta \mathcal{L}_d \quad (5)$$

Then, based on the calculated total loss data $\mathcal{L}$, the parameters of the student network $M^S$ are updated using the back propagation method. The specific parameter updating algorithm is known in the art and will not be repeated here.

In addition, based on the total loss data $\mathcal{L}$, the parameters of the two transitive transfer adapters (i.e., the Normal→Augmented adapter and the Augmented→Normal adapter) and the two classifiers (i.e., the classifier $W_N$ and the classifier $W_A$) can be updated using the back propagation method.

The process described above can be completed in one epoch or one iteration of training. In order to achieve a satisfactory performance, the above process can be repeated several times using the same training image set until a predefined condition is met, for example, the number of repetitions reaches a predetermined maximum number of times, or the calculated total loss is less than a predefined threshold.

[Iterative Training Method of Neural Network]

In the training method described above, the student network is guided by both of the teacher network trained from the normal images and the teacher network trained from the variation images, and different knowledge can be effectively integrated to enhance the robustness of the student network model. However, it is very difficult to learn from multiple variation images at the same time. One solution is to use teacher networks trained from different variation image sets to provide a simultaneous supervision. However, due to the large feature domain discrepancy between different variation images, the performance of the final trained model will inevitably decrease.

The present disclosure proposes an iterative learning strategy to train different variations in different iterations, thereby gradually learning multiple variations.

Figure 7:
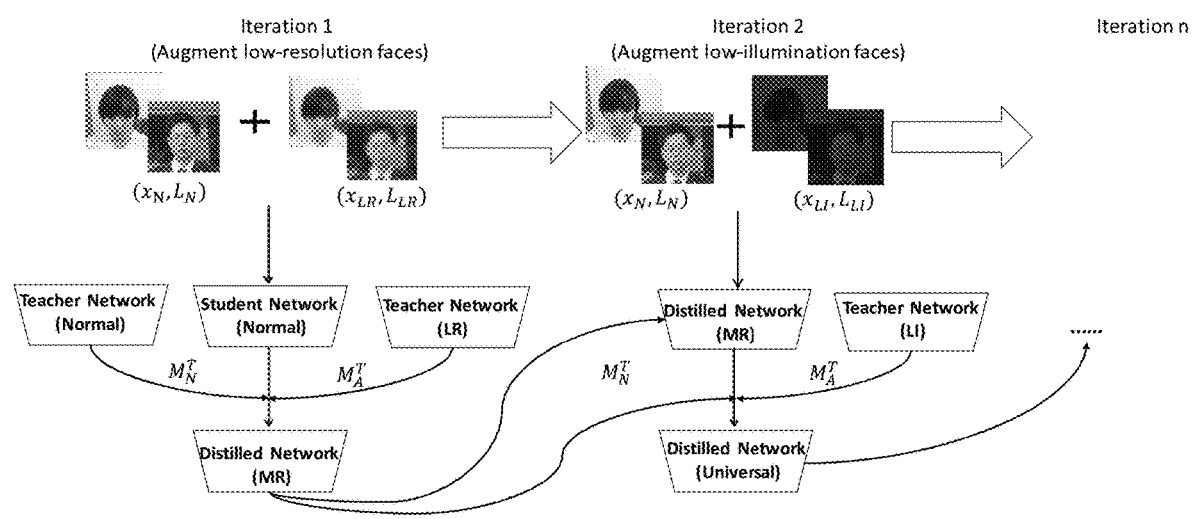
FIG. 7 is a schematic diagram of an iterative training method according to one or more aspects of the present disclosure.

FIG. 7 shows a schematic diagram of the iterative training method according to the present disclosure. As shown in FIG. 7, the iterative training method includes:

1. In the first iteration, a training image set including normal image samples ($x_N$, $L_N$) and image samples ($x_{LR}$, $L_{LR}$) with a first variation (such as low-resolution LR) is input to the student network to be trained, and by using a neural network trained for the normal images and a neural network trained for the image samples with the first variation as teacher networks, the student network is trained by using the training method described above with reference to FIG. 2 to obtain a distillated network (MR);

2. In the second iteration, a training image set including the normal image samples ($x_N$, $L_N$) and image samples ($x_{LI}$, $L_{LI}$) with a second variation (such as low illuminance LI) is input to the distillated network (MR) trained in Step 1, and by using the obtained distillation network (MR) and a neural network trained for the image samples with the second variation as the teacher networks, and the distillation network (MR) continues to be trained by using the training method described above with reference to FIG. 2, to obtain a distillation network (general);

3. If there are other variations, Step 2 is repeated until all of the variations are learned.

Through the above iterative training process, the student network trained in the previous iteration becomes the teacher network $M_N^T$ for supervising the training of new variation images present in the current iteration to avoid forgetting prior knowledge, and serves as the student network for a finer tuning of the initial backbone network model. Another teacher network $M_A^T$ pre-trained for the new variation is used to expand the recognizability of the student network. Therefore, the updated model can focus on integrating a specific feature domain of the variation images in each iteration, while retaining the previously learned knowledge.

[Experimental Verification]

The following will compare the performance of the neural network training method according to the present disclosure with the prior art through experiments.

Experiment 1: Validation on a Small Training Set

Training set: CASIA-WebFace, including 10,000 personal identities and a total of 500,000 images.

Testing set: Scface, including 130 personal identities and a total of 4,160 static images taken by cameras at different distances.

Evaluation criteria: 1:N TPIR (True Positive Recognition Rate, Rank1 @106), the same as Megaface challenge Convolutional Neural Network architecture: RestNet50

Prior arts to be compared: ArcFace, ArcFace+augmentation, DDL (distributed deep learning)

Experimental results:

TABLE 1

Performance comparison between the training method of the present disclosure and the prior art

| Algorithm | d1 | LFW | CFP-FP | AGEDB |
|---|---|---|---|---|
| ArcFace (CAISA + R50) | 67.0% | 95.5% | 99.5% | 87.3% |
| ArcFace (CAISA + R50 + augmentation) | 82.5% | 98.3% | 99.3% | 93.4% |
| DDL | 86.8% | 98.3% | 98.3% | 94.4% |
| TD-Net (The present disclosure) | 88.3% | 99.0% | 99.8% | 95.7% | where the column d1 is the performance on a subset of low-quality images taken by a long-distance camera, the column LFW is the performance on a subset of intermediate-quality images taken by a mid-range camera, the column CFP-FP is the performance on a subset of high-quality images taken by a short-range camera, and AGEDB represents the average performance.

It can be seen from Table 1 that although the prior arts using image augmentation can improve the recognition performance on the low-quality image set, it will result in a decrease in the recognition performance on the high-quality image set. In contrast, the neural network training method according to the present disclosure can achieve an improved performance on the low-quality image set while suppressing the negative transfer on the high-quality image set.

[Training Apparatus and Training Method]

The training apparatus and training method for a neural network for object recognition of the present disclosure will be described below with reference to the accompanying drawings.

Figure 8:
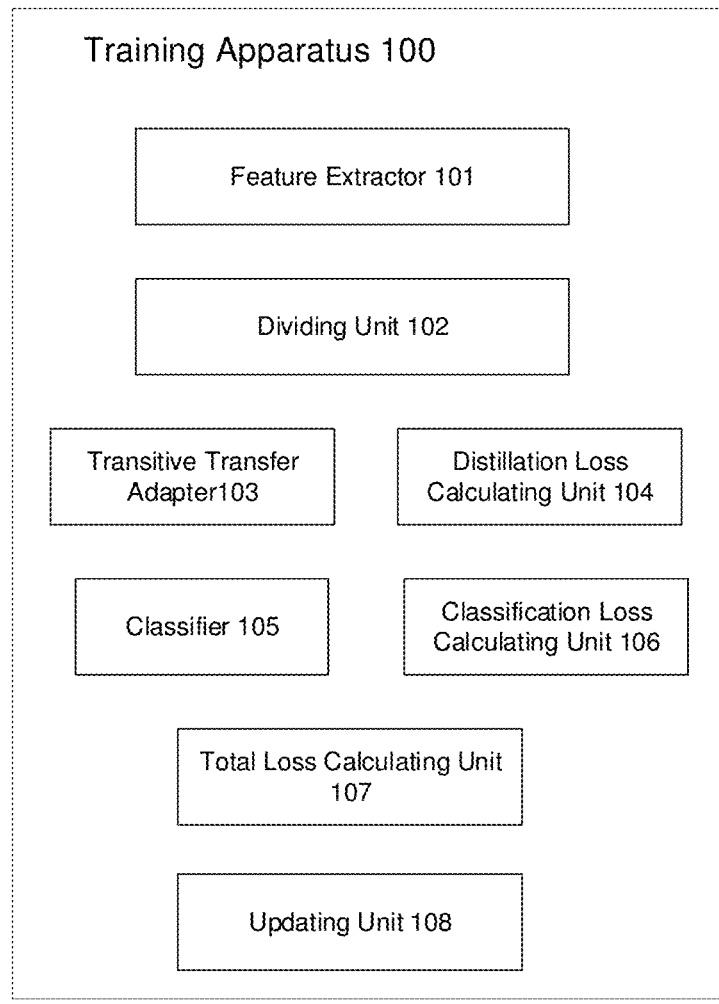
FIG. 8 is a block diagram of configuration of a training apparatus according to one or more aspects of the present disclosure.
Figure 9:
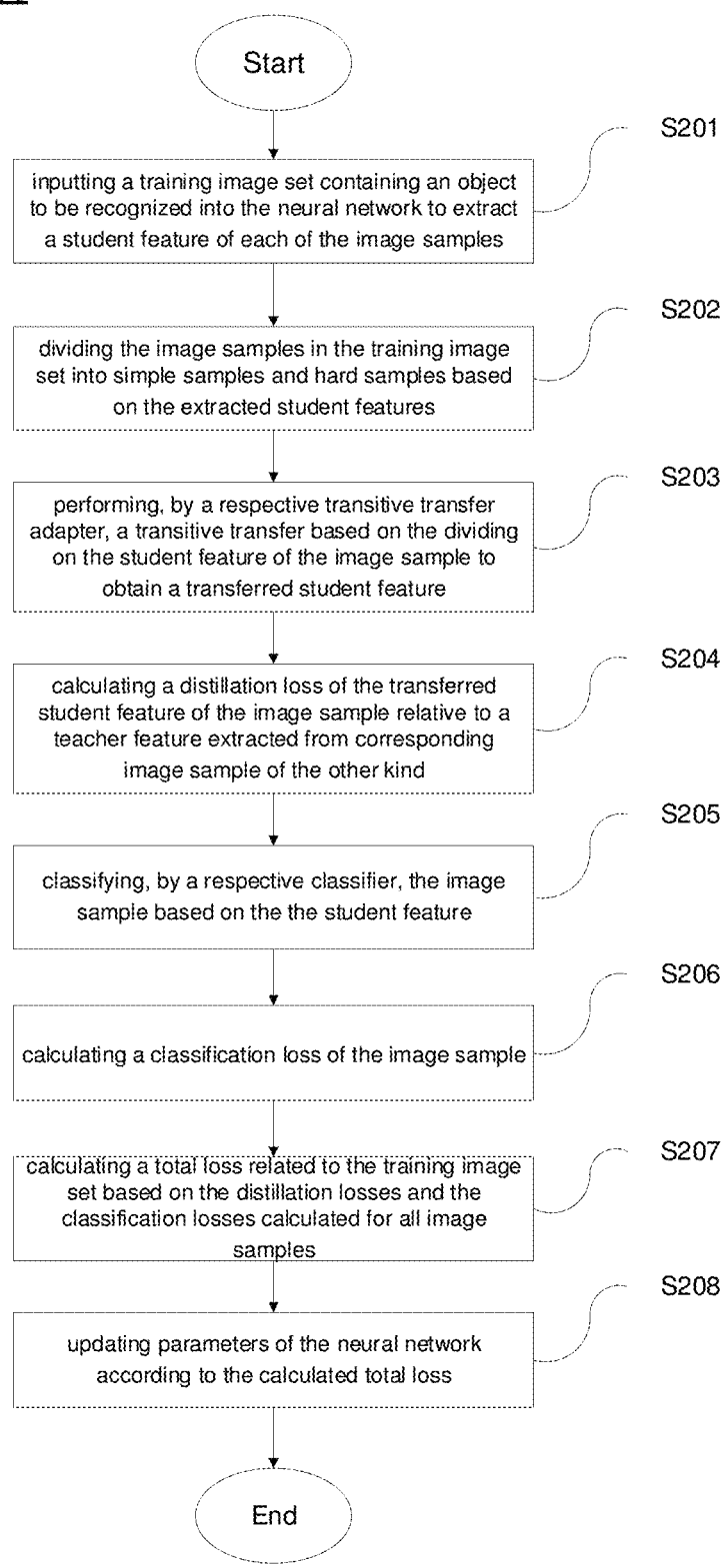
FIG. 9 is a flowchart of a training method according to one or more aspects of the present disclosure.

FIG. 8 is a block diagram showing a training apparatus 100 for a neural network model for object recognition according to the present disclosure, and FIG. 9 is a flow chart showing a training method 200 for a neural network model for object recognition according to the present disclosure. The training apparatus 100 can be used for training, for example, a convolutional neural network, to achieve an excellent recognition performance for images of various qualities. The training apparatus 100 may include a feature extractor 101, a dividing unit 102, a transitive transfer adapter 103, a distillation loss calculation unit 104, a classifier 105, a classification loss calculation unit 106, a total loss calculation unit 107, and an updating unit 108.

The feature extractor 101 is configured to input a training image set containing an object to be recognized into the neural network to be trained to extract a student feature of each image sample (i.e., to perform step S201 of the method 200). The training image set includes a set of normal image samples and a set of variation image samples.

The dividing unit 102 is configured to divide the image samples in the training image set into simple samples and hard samples based on the student features extracted by the feature extractor 101 (i.e., to perform step S202 of the method 200). The dividing unit 102 may perform the dividing based on distances between the student features of the image samples and various feature centers (for example, L1-norm distance).

The transitive transfer adapter 103 is configured to perform transitive transfer based on the dividing result of the dividing unit 102 on the student features of the normal image samples to obtain transferred student features (i.e., to perform step S203 of the method 200). The transitive transfer adapter 103 may include transitive transfer adapters for normal image samples and variation image samples, respectively.

The distillation loss calculation unit 104 is configured to calculate a distillation loss of the transferred student feature of the normal image samples relative to the teacher features extracted from corresponding variation image samples, and calculate a distillation loss of the transferred student features of the variation image samples relative to teacher features extracted from corresponding normal image samples (i.e., to perform step S204 of method 200).

The classifier 105 is configured to classify the image samples based on the student features extracted by the feature extractor 101 (i.e., to perform step S205 of the method 200). The classifier 105 may include classifiers for the normal image samples and the variation image samples, respectively, so as to realize the dual-branch classification.

The classification loss calculation unit 106 is configured to calculate a classification loss of the classification of each image sample by the classifier 105 (i.e., to perform step S206 of the method 200). The classification loss calculation unit 106 may use, for example, an ArcFace loss function, a CosFace loss function, a SphereFace loss function, etc. to calculate the classification loss.

The total loss calculation unit 107 is configured to calculate a total loss related to the training image set based on the distillation loss and the classification loss calculated for all image samples (i.e., to perform step S207 of the method 200). The total loss calculation unit 107 can calculate, for the normal image samples and the corresponding variation image samples, a sum of their distillation losses as a total distillation loss, a weighted sum of their classification losses as a total classification loss, and a weighted sum of the total distillation loss and the total classification loss as the total loss. Wherein, when calculating the total classification loss, the total loss calculation unit 107 may increase the weight of the variation image samples as the current training epoch increases, so as to gradually shift the training focus to the variation image samples.

The update unit 108 is configured to update parameters of the neural network according to the total loss calculated by the total loss calculation unit 107 (i.e., to perform step S208 of the method 200). In addition, the update unit 108 may also update parameters of the transitive transfer adapter 103 and the classifier 105 according to the total loss.

It should be noted that FIG. 8 is only a schematic structural configuration of the training apparatus, and the training apparatus 100 may also include other possible units/components, such as a memory. The memory may store various information generated by the training apparatus (for example, the features of the image samples, the loss data, the parameter values, etc.), programs and data used for operation of the training apparatus, and the like. For example, the memory may include, but is not limited to, random access memory (RAM), dynamic random access memory (DRAM), static random access memory (SRAM), read only memory (ROM), flash memory. As an example, the memory may also be located outside the training apparatus 100. The training apparatus 100 may be directly or indirectly (for example, other components may be connected in between) connected to the memory for data access. The memory may be volatile memory and/or non-volatile memory.

It should be understood that the above-mentioned units are only logical modules divided according to the specific functions they implement, and are not used to limit specific implementation manners. For example, they may be implemented in software, hardware, or a combination of software and hardware. In actual implementation, each of the foregoing units may be implemented as an independent physical entity, or may also be implemented by a single entity (for example, a processor (CPU or DSP, etc.), an integrated circuit, etc.). In addition, the above-mentioned units are shown with dotted lines in the drawings to indicate that these units may not actually exist, and the operations/functions implemented by them can be implemented by the processing circuit itself.

It should be understood that in addition to including a plurality of units, the above-mentioned training apparatus 100 may be implemented in a variety of other forms, for example, it may be a general-purpose processor or a dedicated processing circuit, such as an ASIC. For example, the training apparatus 100 can be constructed by a circuit (hardware) or a central processing device such as a central processing unit (CPU). In addition, the training apparatus 100 may carry a program (software) for operating a circuit (hardware) or a central processing device. The program can be stored in a memory (such as arranged in a memory) or an external storage medium connected from the outside, and downloaded via a network (such as the Internet).

It should be understood that the training method 200 according to the present disclosure may also include the various operations described above, which will not be described in detail here. It should be noted that the various steps/operations of the training method 200 according to the present disclosure can be executed by the units of the above-mentioned training apparatus 100, and can also be executed by various forms of processing circuit.

Various exemplary implementations of the neural network training process according to the present disclosure are described below.

First Example

The first example is directed to a training process in which the training dataset includes sufficient normal image samples and variation image samples (possibly with one or more variations). Here, the number of samples being "sufficient" means that it can meet the convergence requirement of the neural network model.

Figure 10:
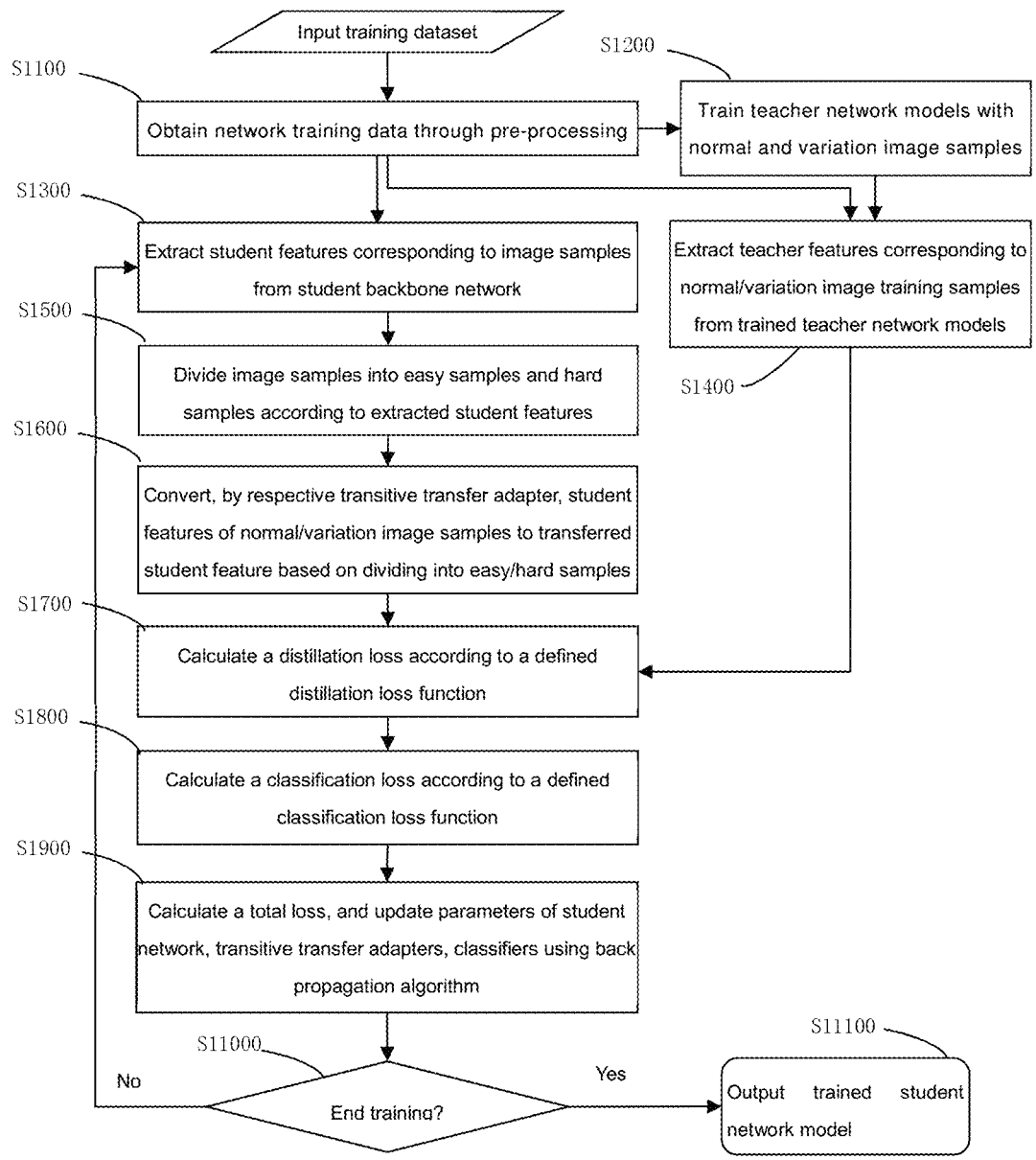
FIG. 10 is a flowchart of a training process according to one or more aspects of the present disclosure.

FIG. 10 shows a flowchart of the neural network training process according to the first example, which includes the following steps.

S1100: Obtaining Network Training Data Through Pre-Processing

In this step, the original images with real labels of objects or faces are input, and then the input original images are converted into training data that meets the requirements of the convolutional neural network model through an existing series of pre-processing operations which include face or object detection, face or object alignment, etc.

S1200: Training the Teacher Network Model

Optionally, in this step, the image sample data having real labels of objects or faces and meeting the requirements of the convolutional neural network model is input. The image sample data include normal image samples and variation image samples. Then, with the existing advanced recognition method such as ArcFace, CosFace, etc., the commonly used convolutional neural network structure such as ResNet or the like is selected, and the neural network is trained on the normal image training set and the variation image training set, resulting in a teacher network model with certain recognition performance on the normal image domain and the variation image domain.

S1300: Extracting Student Features Corresponding to Image Samples from the Student Backbone Network In this step, all image sample data having objects or faces and meeting the requirements of the convolutional neural network model is input, and a selected neural network structure with initial parameters is used as the student network to extract student feature of each of the image samples. The structure of the convolutional neural network may be a common network structure such as VGG16, ResNet, Senet or the like.

S1400: Extracting Teacher Features Corresponding to Normal/Variation Image Training Data In this step, all image sample data having objects or faces and meeting the requirements of the convolutional neural network is input, and then the teacher network models trained in S1200 are used to extract corresponding teacher features from the normal image samples and from the variation image samples, respectively.

S1500: Dividing the Image Samples into Easy Samples and Hard Samples

In this step, the student features extracted in S1300 are input, and all image samples are divided into easy samples and hard samples according to the dynamic sample dividing strategy based on feature distances as described above.

S1600: Transitive Transfer Based on Sample Dividing by Corresponding Transitive Transfer Adapter In this step, on the one hand, the student features extracted from the normal image samples are input into the transitive transfer adapter from the normal domain to the variation domain, and converted into transferred student features according to the dividing of easy/hard samples; on the other hand, the student features extracted from the variation image samples are input into the transitive transfer adapter from the variation domain to the normal domain, and are converted into transferred student features according to the dividing of easy/hard samples.

S1700: Calculating a Distillation Loss

In this step, the distillation loss is calculated according to a defined distillation loss function. The distillation loss is defined as a part of the intra-class loss, which consists of two parts: (1) a distance of the transferred student feature of a variation image sample relative to the teacher feature of its corresponding normal image sample, such as a L1-norm distance; and (2) a distance of the transferred student feature of a normal image sample relative to the teacher feature of its corresponding variation image sample, such as a L1-norm distance.

S1800: Calculating a Classification Loss

In this step, classifications are performed on two branches of the normal image samples and the variation image samples, and a classification loss of the normal image sample and a classification loss of the variation image sample are respectively calculated according to a defined classification loss function, that is, the intra-class classification losses. Based on the curriculum learning strategy, the inter-class classification loss is obtained by calculating a weighted sum of the classification loss of the normal image sample and the classification loss of the variation image sample. Specific classification loss functions are, for example, ArcFace, CosFace, SphereFace or the like.

S1900: Calculating a Total Loss and Updating Parameters Based on the Total Loss

Based on the distillation losses calculated in S1700 and the classification losses calculated in S1800, the total loss related to the training image set is calculated. According to the calculated total loss, the back propagation algorithm is used to update the parameters of the student backbone network, the parameters of the transitive transfer adapters and the parameters of the classifiers.

S11000: Determining Whether the Training Process is Completed

In this step, whether the training is completed may be determined by a predefined condition, for example, whether the currently calculated total loss is less than a predefined threshold, or whether the current number of epochs/iterations of training reaches a predefined maximum number of epochs/iterations. If the condition is met, the model training is completed; otherwise, the next training process proceeds.

S11100: Outputting the Trained Student Backbone Network Model

In this step, the current parameters of all layers in the student backbone network constitute a trained model, and thus only the student backbone network structure and the current parameter information are output.

Second Example

The second example is directed to desirably obtaining a neural network model with good recognizability in a specific variation scene when the training dataset only includes normal image samples. For example, there may be scenes such as outdoor/night/monitoring/sports, and the object images taken in these scenes may have various variations, for example, in angle/pose/illuminance/blur/size.

Figure 11:
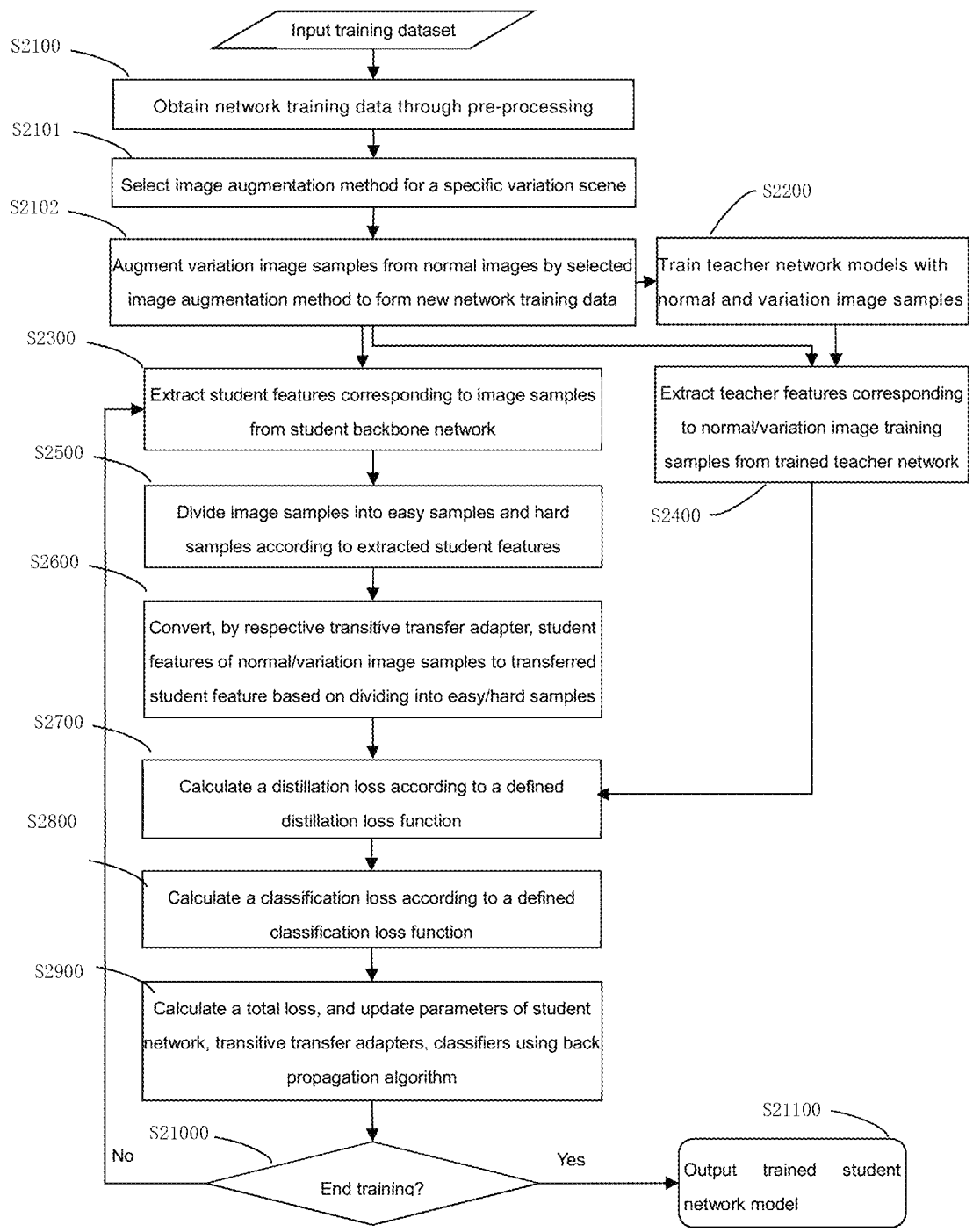
FIG. 11 is a flowchart of a training process according to one or more aspects of the present disclosure.

FIG. 11 shows a flowchart of a neural network training process according to the second example. Compared with the first example, the second example is different in including steps S2101-S2102.

Step S2101: Selecting Corresponding Image Augmentation Method for the Variation Scene In this step, the corresponding image augmentation method is selected for the variation scene under consideration. For example, in order to improve the performance of the neural network model in the low-illuminance scene, an image augmentation method for reducing the brightness of the images can be selected so as to augment the low-illuminance variation images; or to adapt the neural network model to the low-resolution scene, an image augmentation method for reducing the image resolution can be selected so as to augment the low-resolution variation images, and so on.

In this step, alternative image augmentation methods can include a simple image processing algorithm or an image processing model trained by deep learning.

Step S2102: Augmenting Variation Image Samples from Normal Images

In this step, the selected image augmentation method is used to augment the variation image samples from the normal images processed in S2100. It is not necessary to augment the variation image samples corresponding to all normal image samples, as long as the number of variation image samples is as needed.

Thus, the normal image samples and the augmented variation image samples can be input into the backbone student network as network training data. The remaining steps S2200-S21100 are the same as the steps S1200-S11100 of the first example, and will not be repeated here.

Third Example

The third example is directed to desirably obtaining a neural network model with good recognizability in a specific variation scene when the training dataset includes only normal image samples and a small number of variation image samples in this variation scene.

Figure 12:
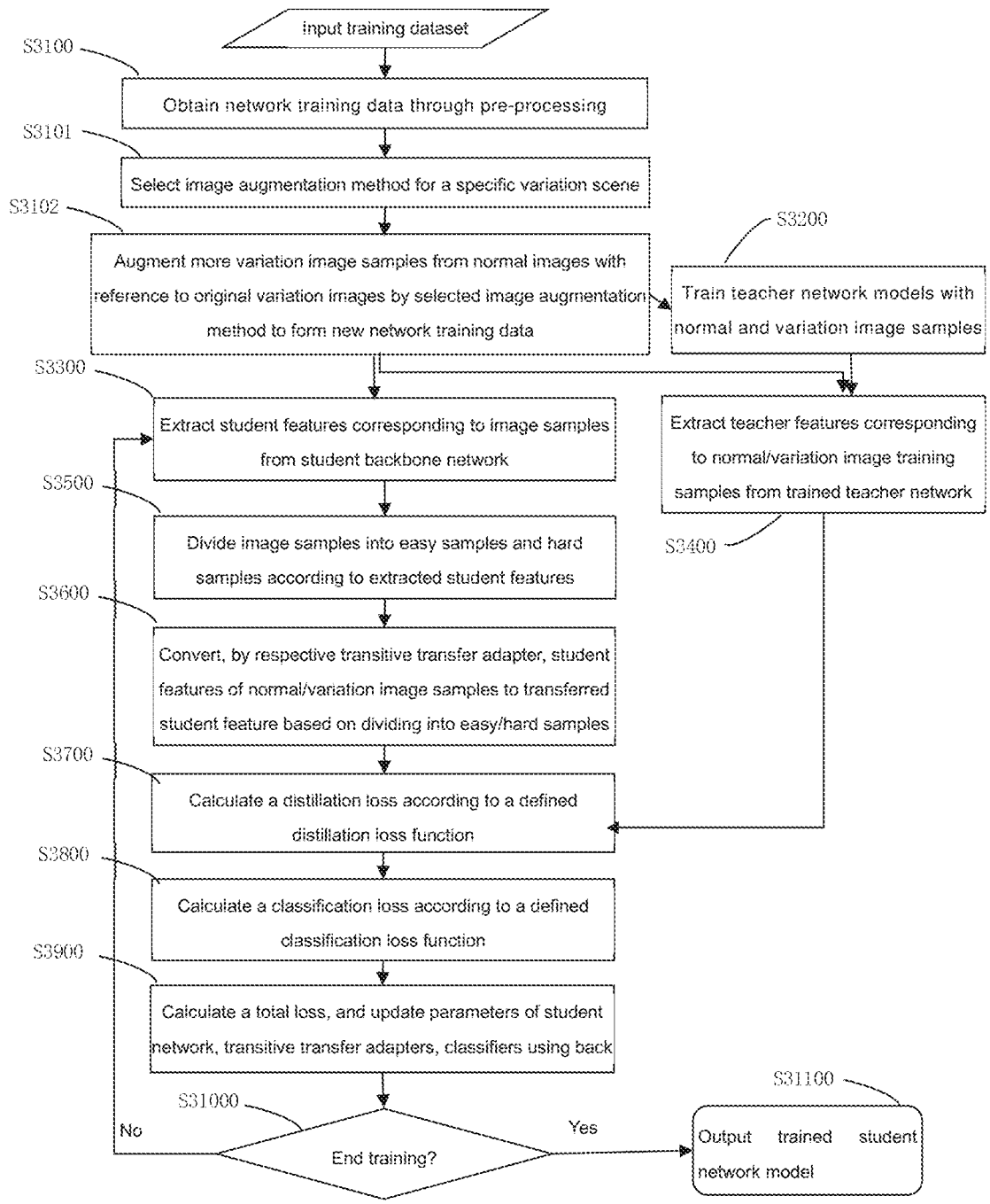
FIG. 12 is a flowchart of a training process according to one or more aspects of the present disclosure.

FIG. 12 shows a flowchart of the neural network training process according to the third example. Compared with the first example, the third example is different in including steps S3101-S3102.

Step S3101: Selecting Corresponding Image Augmentation Method for the Variation Scene In this step, the corresponding image augmentation method is selected for the variation scene under consideration. In the third example, an image processing model based on deep learning (for example, a generative adversarial network) can be used to learn the variation scene involved in the existing variation images in the training dataset, so as to augment more variation image samples in the same variation scene.

Step S3102: Augmenting Variation Image Samples from Normal Images

In this step, the selected image augmentation method is used to augment variation image samples from the normal images processed in S3100 so as to expand the training dataset.

Thus, the normal image samples and the augmented variation image samples can be input into the backbone student network as network training data. The remaining steps S3200-S31100 are the same as the steps S1200-S11100 of the first example, and will not be repeated here.

Fourth Example

The fourth example is directed to obtaining a neural network model with good recognizability in a plurality of variation scenes by using the iterative training method as described above.

Figure 13:
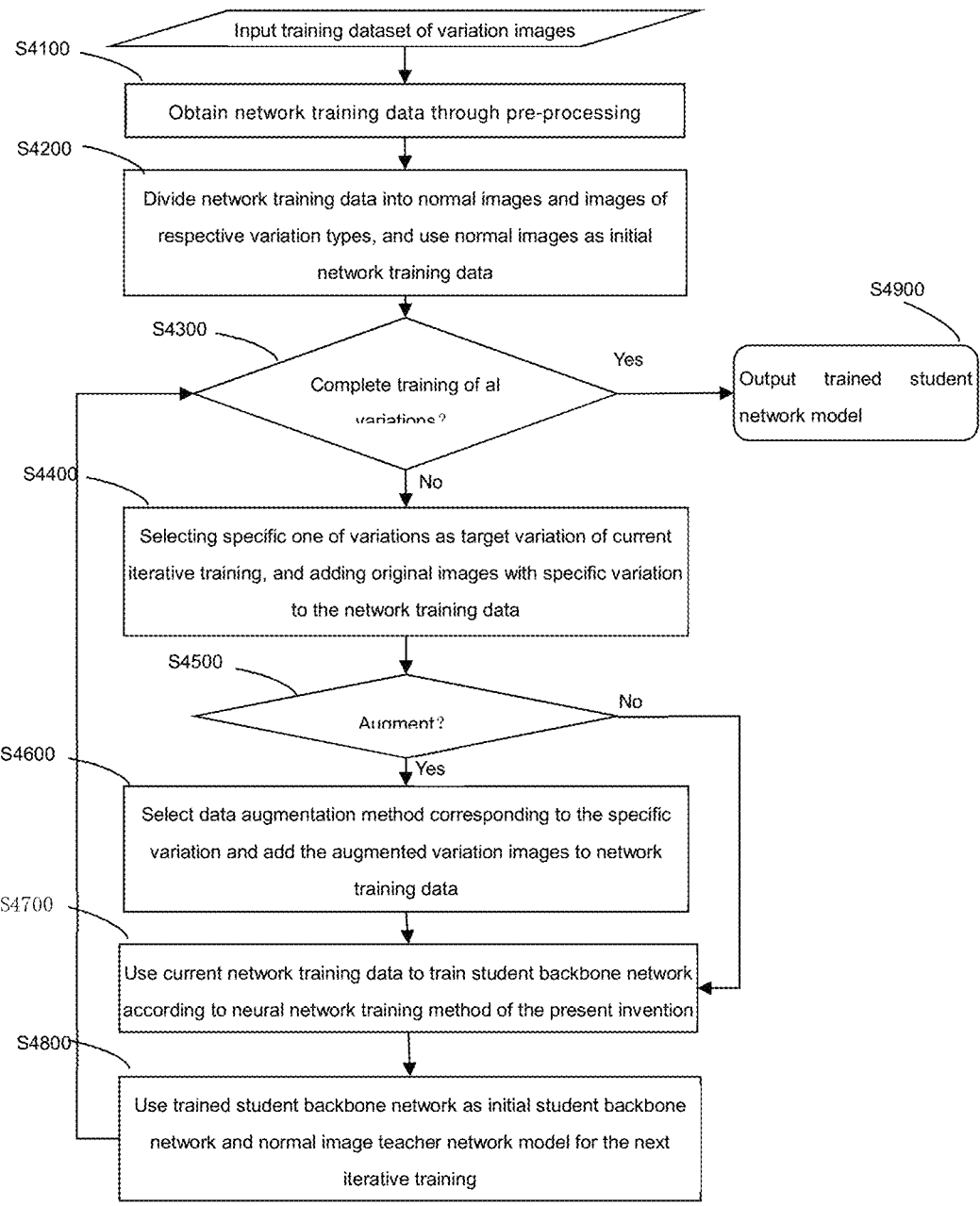
FIG. 13 is a flowchart of a training process according to one or more aspects of the present disclosure.

FIG. 13 shows a flowchart of the neural network training process according to the fourth example, which includes the following steps.

S4100: Obtaining Network Training Data with Pre-Processing

This step is the same as S1100.

S4200: Dividing the Network Training Data into Normal Images and Images of Respective Variation Types, and Using the Normal Images as the Initial Network Training Data In this step, the input is all pre-processed network training data, and then we can divide these training data into normal image samples and various variation image samples through manual judgment or some predefined threshold, and assign respective labels to them. The normal image samples are used as the initial network training data.

S4300: Determining Whether all Variation Types to be Trained have Completed Training In this step, variation types expected to be training should be defined first, and then it is determined whether all the variation types have completed the training. If yes, the training is completed, and the trained student backbone network model is output; otherwise, it proceeds to step S4400.

S4400: Selecting Specific One of the Variations as the Target Variation of Current Iterative Training, and Adding the Original Images with the Specific Variation to the Network Training Data In this step, for the variation type that has not been trained yet, if there are variation image samples of the variation type in the network training data obtained through pre-processing in S4100, these variation images are added to the network training data.

S4500: Determining Whether Augmentation is Needed for the Current Variation Type In this step, the number of variation image samples of the current variation type in the current network training data is determined first, and then it is determined whether augmentation is needed according to the number of variation image samples. If the number is lower than a given threshold, the augmentation is needed and the process proceeds to S4600; otherwise, the process proceeds to S4700.

S4600: Selecting a data augmentation method corresponding to the specific variation and adding the augmented variation images to the network training data This step is the same as S2102 and S3102.

S4700: Using the Current Network Training Data to Train the Student Backbone Network In this step, the network training data that includes the normal image samples and the variation image samples of the current variation type (existing in the original training dataset, or obtained through augmentation) is input, and the student backbone network is trained using the training process in the first example as described earlier.

S4800: Using the Trained Student Backbone Network as Initial Student Backbone Network and Normal Image Teacher Network Model for the Next Iterative Training In this step, on the one hand, the trained student backbone network should be used as the initial student backbone network for the next iterative training, and on the other hand, the previous normal image teacher network model should be replaced with the currently trained student backbone network model.

S4900: Outputting the Trained Student Backbone Network Model

This step is the same as S11100.

With the fourth example, it is possible to learn one new variation scene per iteration, while retaining the knowledge learned for other variation scenes.

[Computer System]

Figure 14:
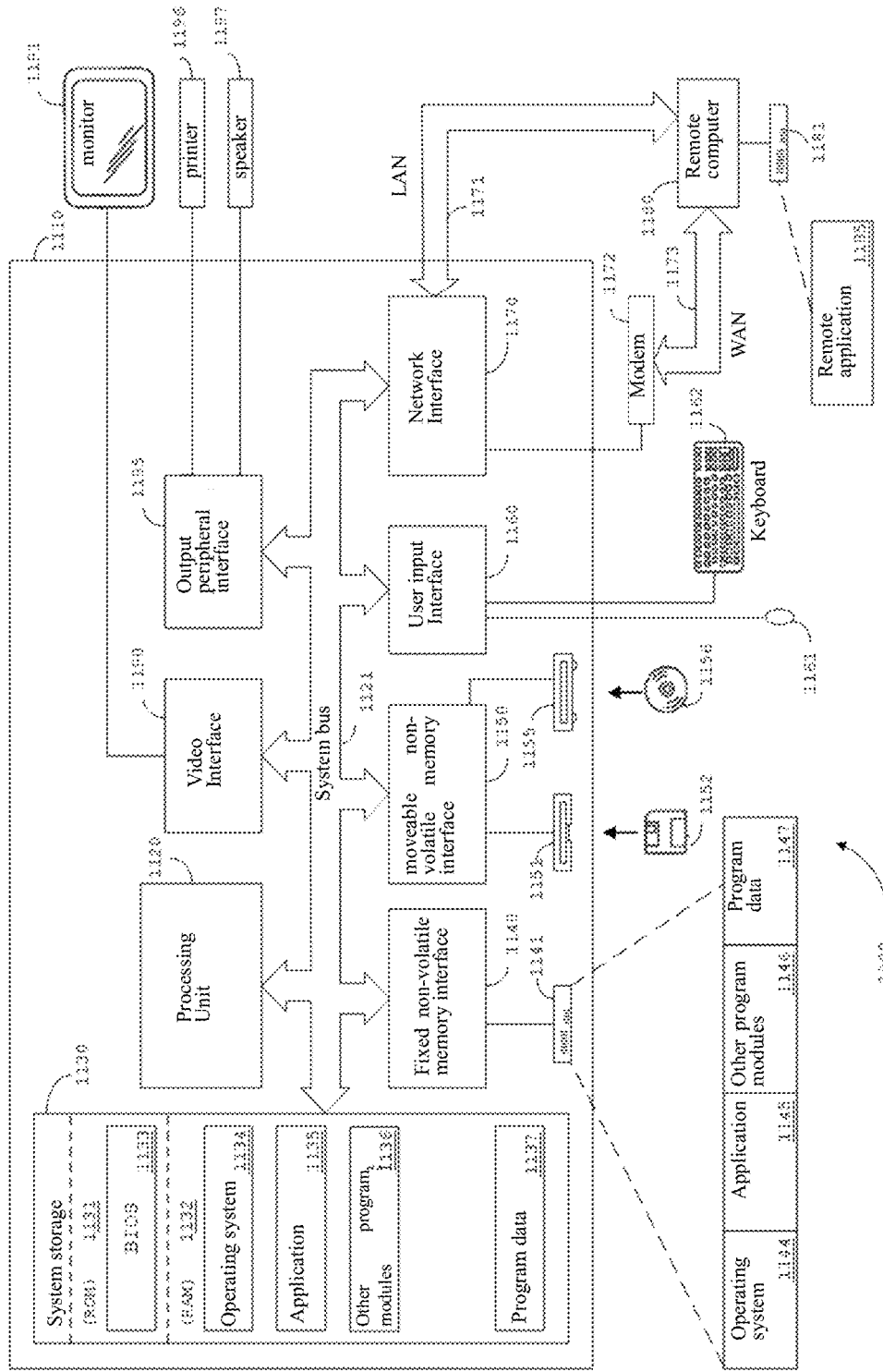
FIG. 14 shows a block diagram of an exemplary hardware configuration of a computer system capable of implementing embodiments of the present disclosure.

FIG. 14 is a block diagram showing an exemplary hardware configuration of a computer system 1000 that can implement an embodiment of the present disclosure.

As shown in FIG. 14, the computer system comprises a computer 1110. The computer 1110 includes a processing unit 1120, a system storage 1130, a non-removable non-volatile memory interface 1140, a removable non-volatile memory interface 1150, a user input interface 1160, a network interface 1170, a vide interface 1190, and an output peripheral interface 1195, which are connected via a system bus 1121.

The system storage 1130 includes a ROM (readable only memory) 1131 and a RAM (random accessible memory) 1132. BIOS (basic input and output system) 1133 resides in ROM 1131. An operating system 1134, application program 1135, other program module 1136 and some program data 1137 reside in the RAM 1132.

A non-removable non-volatile memory 1141, such as a hard disk, is connected to the non-removable non-volatile memory interface 1140. The non-removable non-volatile memory 1141 may store, for example, an operating system 1144, an application program 1145, other program modules 1146, and some program data 1147.

Removable non-volatile memory (such as a floppy disk driver 1151 and a CD-ROM driver 1155) is connected to the removable non-volatile memory interface 1150. For example, a floppy disk 1152 may be inserted into the floppy disk driver 1151, and a CD (Compact Disc) 1156 may be inserted into the CD-ROM driver 1155.

Input devices such as a mouse 1161 and a keyboard 1162 are connected to the user input interface 1160.

The computer 1110 may be connected to a remote computer 1180 through a network interface 1170. For example, the network interface 1170 may be connected to a remote computer 1180 via a local area network 1171. Alternatively, the network interface 1170 may be connected to a modem (modulator-demodulator) 1172, and the modem 1172 is connected to a remote computer 1180 via a wide area network 1173.

The remote computer 1180 may include a storage 1181, such as a hard disk, that stores remote applications 1185.

The video interface 1190 is connected to a monitor 1191.

The output peripheral interface 1195 is connected to a printer 1196 and a speaker 1197.

The computer system shown in FIG. 14 is merely illustrative and is in no way intended to limit the disclosure, its application, or its usage.

The computer system shown in FIG. 14 may be implemented as an isolated computer or as a processing system in an apparatus for any embodiment, in which one or more unnecessary components may be removed or one or more additional components may be added.

The disclosure can be used in many applications. For example, the present disclosure can be used to monitor, identify, and track objects in still images or mobile videos captured by a camera, and is particularly advantageous for camera-equipped portable devices, (camera-based) mobile phones, and the like.

It should be noted that the methods and devices described herein may be implemented as software, firmware, hardware, or any combination thereof. Some components may be implemented, for example, as software running on a digital signal processor or microprocessor. Other components may be implemented, for example, as hardware and/or application specific integrated circuits.

In addition, the methods and systems of the present disclosure can be implemented in a variety of ways. For example, the methods and systems of the present disclosure may be implemented in software, hardware, firmware, or any combination thereof. The order of the steps of the method described above is merely illustrative, and unless specifically stated otherwise, the steps of the method of the present disclosure are not limited to the order specifically described above. In addition, in some embodiments, the present disclosure may also be embodied as a program recorded in a recording medium, including machine-readable instructions for implementing a method according to the present disclosure. Therefore, the present disclosure also encompasses a recording medium storing a program for implementing the method according to the present disclosure.

Those skilled in the art will appreciate that the boundaries between the operations described above are merely illustrative. Multiple operations can be combined into a single operation, a single operation can be distributed among additional operations, and operations can be performed with at least partially being overlapped in time. Moreover, alternative embodiments may include multiple instances of a particular operation, and the order of operations may be changed in other various embodiments. However, other modifications, variations, and substitutions are also possible. Accordingly, the description and drawings of the present disclosure are to be regarded as illustrative rather than restrictive.

Although some specific embodiments of the present disclosure have been described in detail through examples, those skilled in the art should understand that the above examples are only for the purpose of illustration and are not intended to limit the scope of the present disclosure. The embodiments disclosed herein may be arbitrarily combined without departing from the spirit and scope of the present disclosure. Those skilled in the art should also understand that various modifications can be made to the embodiments without departing from the scope and spirit of the present disclosure.

In addition, the embodiments of the present disclosure may also include the following schematic examples (EE).

EE1. A training method of a neural network for object recognition, comprising: inputting a training image set containing an object to be recognized, which includes a set of normal image samples and a set of variation image samples, into the neural network to extract a student feature of each of the image samples; dividing the image samples in the training image set into simple samples and hard samples based on the extracted student features; for each kind of the normal image sample and the variation image sample: performing, by a respective transitive transfer adapter, a transitive transfer based on the dividing on the student feature of the image sample to obtain a transferred student feature; calculating a distillation loss of the transferred student feature of the image sample relative to a teacher feature extracted from corresponding image sample of the other kind; classifying, by a respective classifier, the image sample based on the student feature; and calculating a classification loss of the image sample, calculating a total loss related to the training image set based on the distillation losses and the classification losses calculated for all image samples; and updating parameters of the neural network according to the calculated total loss.

EE2. The training method of EE1, wherein the set of variation image samples include image samples augmented from the set of normal image samples using an augmentation method for one or more variation scenes.

EE3. The training method according to EE1, wherein the set of variation image samples include original variation image samples and variation image samples augmented from the set of normal image samples by referring to the original variation image samples.

EE4. The training method of EE1, wherein the dividing further comprises: calculating a first feature center of student features of all image samples, a second feature center of student features of the set of normal image samples, and a third feature center of student features of the set of variation image samples, respectively; and based on distances between each of the image samples and the first feature center, the second feature center, and the third feature center, dividing the image sample into a simple sample or a hard sample.

EE5. The training method of EE4, wherein, for each of the normal image samples, if the distance between the student feature of the image sample and the first feature center is less than a threshold or the distance between the student feature of the image sample and the second feature center is less than a threshold, the image sample is divided into simple samples, otherwise the image sample is divided into hard samples; for each of the variation image samples, if the distance between the student feature of the image sample and the first feature center is less than a threshold or the distance between the student feature of the image sample and the third feature center is less than a threshold, the image sample is divided into simple samples, otherwise the image sample is divided into hard samples.

EE6. The training method of EE5, wherein the thresholds are determined by an adjustable parameter, and the adjustable parameter is a function of the current training epoch and increases as the current training epoch increases.

EE7. The training method of EE1, wherein the transitive transfer adapter is composed of a plurality of convolutional layers that maintain a number of feature dimensions constant.

EE8. The training method according to EE1, wherein the transitive transfer based on the dividing further comprises: for an image sample divided into simple samples, taking a deep output of the transitive transfer adapter as the transferred student feature; for an image sample divided in hard samples, taking a shallow output of the transitive transfer adapter as the transferred student feature.

EE9. The training method according to EE1, wherein for a normal image sample, its teacher feature is a feature extracted by a teacher neural network trained on a training image set that includes only normal images; for a variation image sample, its teacher feature is a feature extracted by a second teacher neural network trained on a training image set that includes only variation images.

EE10. The training method of EE1, wherein the distillation loss is calculated as: a distance between the transferred student feature of a normal image sample and the teacher feature of corresponding variation image sample, or a distance between the transferred student of a variation image sample and the teacher feature of corresponding normal image sample.

EE11. The training method of EE1, wherein the classification loss is calculated by one of the following classification loss functions: ArcFace loss function, CosFace loss function, and SphereFace loss function.

EE12. The training method of EE1, wherein the calculating a total loss related to the training image set further comprises: calculating a sum of the distillation losses of the normal image samples and the corresponding variation image samples as a total distillation loss; calculating a weighted sum of the classification losses of the normal image samples and the corresponding variation image samples as a total classification loss; and calculating a weighted sum of the total distillation loss and the total classification loss as the total loss.

EE13. The training method of EE12, wherein when calculating the total classification loss, the weight for the classification loss of the variation image sample is a function of the current training epoch and increases as the current training epoch increases.

EE14. The training method of EE1, wherein the parameters of the neural network are updated using the total loss by means of a back propagation algorithm.

EE15. The training method of EE1, further comprising updating parameters of the transitive transfer adapter and parameters of the classifiers by using the total loss.

EE16. The training method of EE1, wherein the steps of the training method are repeated multiple times until at least one of the following conditions is met: the number of repetitions reaches a predefined maximum number of times, or the calculated total loss is less than a predefined threshold.

EE17. The training method of EE1, wherein the object to be recognized include a face, a person, and a physical object.

EE18. A training apparatus for a neural network for object recognition, comprising: a feature extractor configured to input a training image set containing an object to be recognized, which includes a set of normal image samples and a set of variation image samples, into the neural network to extract a student feature of each of the image samples; a dividing unit configured to divide the image samples in the training image set into simple samples and hard samples based on the extracted student features; for each kind of the normal image sample and the variation image sample: a transitive transfer adaptor configured to perform, by respective transitive transfer adapter, a transitive transfer based on the dividing on the student feature of the image sample to obtain a transferred student feature; a distillation loss calculating unit configured to calculate a distillation loss of the transferred student feature of the image sample relative to a teacher feature extracted from corresponding image sample of the other kind; a classifier configured to classify the image sample based on the student feature; and a classification loss calculating unit configured to calculate a classification loss of the image sample, a total loss calculating unit configured to calculate a total loss related to the training image set based on the distillation losses and the classification losses calculated for all image samples; and an updating unit configured to update parameters of the neural network according to the calculated total loss.

EE19. An iterative training method for use on a neural network for object recognition, comprising: a first training step of training the neural network using the training method of claim 1 by taking an image set including a set of normal image samples and a set of variation image samples for a first variation scene as the training image set; and a second training step of training the neural network, which has undergone the first training step, using the training method of claim 1 by taking an image set including the set of normal image samples and a set of variation image samples for a second variation scene as the training image set.

EE20. A neural network trained according to the training method of EE1 or EE19.

EE21. A device comprising: a processor; and a memory storing executable instructions thereon, which, when executed by the processor, cause the processor to perform the training method of any of EE1-EE17 and EE19.

EE22. A non-transitory computer-readable storage medium storing executable instructions thereon, which, when executed, cause the processor to perform the training method of any of EE1-EE17 and EE19.

What is claimed is:

1. A training method of a neural network for object recognition, comprising:
   inputting a training image set containing an object to be recognized, which includes a set of image samples and a set of variation image samples, into the neural network to extract a student feature of each of the image samples;
   dividing the image samples in the training image set into simple samples and hard samples based on feature distances of the extracted student features;
   for each kind of the image sample and the variation image sample:
     performing, by a respective transitive transfer adapter, a transitive transfer based on the dividing on the student feature of the image sample to obtain a transferred student feature;
     calculating a distillation loss of the transferred student feature of the image sample relative to a teacher feature extracted from corresponding image sample of the other kind;
     classifying, by a respective classifier, the image sample based on the student feature; and
     calculating a classification loss of the image sample,
   calculating a total loss related to the training image set based on the distillation losses and the classification losses calculated for image samples; and
   updating parameters of the neural network according to the calculated total loss.

2. The training method of claim 1, wherein the set of variation image samples include image samples augmented from the set of image samples using an augmentation method for one or more variation scenes.

3. The training method of claim 1, wherein the set of variation image samples include original variation image samples and variation image samples augmented from the set of image samples by referring to the original variation image samples.

4. The training method of claim 1, wherein the dividing further comprises:
   calculating a first feature center of student features of all image samples, a second feature center of student features of the set of image samples, and a third feature center of student features of the set of variation image samples, respectively; and
   based on distances between each of the image samples and the first feature center, the second feature center, and the third feature center, dividing the image sample into a simple sample or a hard sample.

5. The training method of claim 4, wherein, for each of the image samples, if the distance between the student feature of the image sample and the first feature center is less than a threshold or the distance between the student feature of the image sample and the second feature center is less than a threshold, the image sample is divided into simple samples, otherwise the image sample is divided into hard samples;
   for each of the variation image samples, if the distance between the student feature of the image sample and the first feature center is less than a threshold or the distance between the student feature of the image sample and the third feature center is less than a threshold, the image sample is divided into simple samples, otherwise the image sample is divided into hard samples.

6. The training method of claim 5, wherein the thresholds are determined by an adjustable parameter, and the adjustable parameter is a function of the current training epoch and increases as the current training epoch increases.

7. The training method of claim 1, wherein the transitive transfer adapter is composed of a plurality of convolutional layers that maintain a number of feature dimensions constant.

8. The training method of claim 1, wherein the transitive transfer based on the dividing further comprises:
for an image sample divided into simple samples, taking a deep output of the transitive transfer adapter as the transferred student feature;
for an image sample divided in hard samples, taking a shallow output of the transitive transfer adapter as the transferred student feature.

9. The training method of claim 1, wherein for a image sample, its teacher feature is a feature extracted by a teacher neural network trained on a training image set that includes only images;
for a variation image sample, its teacher feature is a feature extracted by a second teacher neural network trained on a training image set that includes only variation images.

10. The training method of claim 1, wherein the distillation loss is calculated as: a distance between the transferred student feature of a image sample and the teacher feature of corresponding variation image sample, or a distance between the transferred student of a variation image sample and the teacher feature of corresponding image sample.

11. The training method of claim 1, wherein the classification loss is calculated by one of the following classification loss functions: ArcFace loss function, CosFace loss function, and SphereFace loss function.

12. The training method of claim 1, wherein the calculating a total loss related to the training image set further comprises:
calculating a sum of the distillation losses of the image samples and the corresponding variation image samples as a total distillation loss;
calculating a weighted sum of the classification losses of the image samples and the corresponding variation image samples as a total classification loss; and
calculating a weighted sum of the total distillation loss and the total classification loss as the total loss.

13. The training method of claim 12, wherein when calculating the total classification loss, the weight for the classification loss of the variation image sample is a function of the current training epoch and increases as the current training epoch increases.

14. The training method of claim 1, wherein the parameters of the neural network are updated using the total loss by means of a back propagation algorithm.

15. The training method of claim 1, further comprising updating parameters of the transitive transfer adapter and parameters of the classifiers by using the total loss.

16. The training method of claim 1, wherein the steps of the training method are repeated multiple times until at least one of the following conditions is met: the number of repetitions reaches a predefined maximum number of times, or the calculated total loss is less than a predefined threshold.

17. The training method of claim 1, wherein the object to be recognized include a face, a person, and a physical object.

18. An iterative training method for a neural network for object recognition, comprising:
a first training step of training the neural network using the training method of claim 1 by taking an image set including a set of image samples and a set of variation image samples for a first variation scene as the training image set; and
a second training step of training the neural network, which has undergone the first training step, using the training method of claim 1 by taking an image set including the set of image samples and a set of variation image samples for a second variation scene as the training image set.

19. A device comprising:
a processor; and
a memory storing executable instructions thereon, which, when executed by the processor, cause a device to:
input a training image set containing an object to be recognized, which includes a set of image samples and a set of variation image samples, into the neural network to extract a student feature of each of the image samples;
divide the image samples in the training image set into simple samples and hard samples based on feature distances of the extracted student features;
for each kind of the image sample and the variation image sample:
perform, by a respective transitive transfer adapter, a transitive transfer based on the dividing on the student feature of the image sample to obtain a transferred student feature;
calculate a distillation loss of the transferred student feature of the image sample relative to a teacher feature extracted from corresponding image sample of the other kind;
classify, by a respective classifier, the image sample based on the student feature; and
calculate a classification loss of the image sample,
calculate a total loss related to the training image set based on the distillation losses and the classification losses calculated for image samples; and
update parameters of the neural network according to the calculated total loss.

20. A non-transitory computer-readable storage medium storing a program which, when executed, cause a device to execute a training method of a neural network for object recognition, the method comprising:
inputting a training image set containing an object to be recognized, which includes a set of image samples and a set of variation image samples, into the neural network to extract a student feature of each of the image samples;
dividing the image samples in the training image set into simple samples and hard samples based on feature distances of the extracted student features;
for each kind of the image sample and the variation image sample:
performing, by a respective transitive transfer adapter, a transitive transfer based on the dividing on the student feature of the image sample to obtain a transferred student feature;
calculating a distillation loss of the transferred student feature of the image sample relative to a teacher feature extracted from corresponding image sample of the other kind;

classifying, by a respective classifier, the image sample based on the student feature; and calculating a classification loss of the image sample, calculating a total loss related to the training image set based on the distillation losses and the classification losses calculated for image samples; and updating parameters of the neural network according to the calculated total loss.

* * * * *